US012015828B2

(12) United States Patent
Kang et al.

(10) Patent No.: US 12,015,828 B2
(45) Date of Patent: Jun. 18, 2024

(54) CONTENT SHARING METHOD AND APPARATUS

(71) Applicant: DINGTALK HOLDING (CAYMAN) LIMITED, Grand Cayman (KY)

(72) Inventors: Shangmingxue Kang, Hangzhou (CN); Rongjun Wang, Hangzhou (CN); Xinghe Wu, Hangzhou (CN)

(73) Assignee: DINGTALK HOLDING (CAYMAN) LIMITED, Grand Cayman (KY)

( * ) Notice: Subject to any disclaimer, the term of this patent is extended or adjusted under 35 U.S.C. 154(b) by 129 days.

(21) Appl. No.: 17/717,004

(22) Filed: Apr. 8, 2022

(65) Prior Publication Data

US 2022/0239986 A1 Jul. 28, 2022

Related U.S. Application Data

(63) Continuation of application No. PCT/CN2020/118652, filed on Sep. 29, 2020.

(30) Foreign Application Priority Data

Oct. 9, 2019 (CN) .......................... 201910954054.4

(51) Int. Cl.
G06F 15/16 (2006.01)
H04L 51/04 (2022.01)
(Continued)

(52) U.S. Cl.
CPC ......... *H04N 21/4788* (2013.01); *H04L 51/04* (2013.01); *H04L 51/10* (2013.01)

(58) Field of Classification Search
CPC ........... H04N 21/4788; H04N 21/2668; H04N 21/25875; H04N 21/2743; H04L 51/04;
(Continued)

(56) References Cited

U.S. PATENT DOCUMENTS 8,543,665 B2 9/2013 Ansari et al.
8,776,121 B2 7/2014 Gossweiler, III
(Continued)

FOREIGN PATENT DOCUMENTS

CN 102891897 A 1/2013
CN 104023069 A 9/2014
(Continued)

OTHER PUBLICATIONS

Written Opinion for Singapore Patent Application No. 11202203620S dated Oct. 19, 2022.
(Continued)

*Primary Examiner* — John B Walsh

(57) ABSTRACT

Provided in one or more embodiments of the present description are a content sharing method and apparatus. The method may comprise: a server receiving a content sharing request initiated by a sharing party user, wherein the content sharing request is used for sharing content to be shared, submitted by the sharing party user, in an organization where the sharing party user is located; and the server releasing the content to be shared to the organization, so that the content to be shared is presented on a content sharing interface related to the organization.

19 Claims, 15 Drawing Sheets

(51) Int. Cl.
*H04L 51/10* (2022.01)
*H04N 21/4788* (2011.01)

(58) Field of Classification Search
CPC . H04L 12/1813; H04L 12/1822; H04L 51/10; H04L 12/185
See application file for complete search history.

(56) References Cited

U.S. PATENT DOCUMENTS

| | | | |
|---|---|---|---|
| 8,826,375 | B2 | 9/2014 | Smith et al. |
| 9,324,078 | B2 | 4/2016 | Palahnuk |
| 9,792,760 | B2 | 10/2017 | Barclay et al. |
| 10,026,108 | B2 | 7/2018 | Jackson et al. |
| 10,126,927 | B1 | 11/2018 | Fieldman |
| 10,212,110 | B2 | 2/2019 | Lee et al. |
| 10,331,303 | B1 | 6/2019 | Gurtin et al. |
| 10,346,378 | B1 * | 7/2019 | Jones .............. G06F 16/252 |
| 10,374,984 | B2 | 8/2019 | So |
| 10,659,408 | B2 | 5/2020 | Wang et al. |
| 2006/0143295 | A1 | 6/2006 | Costa-requena et al. |
| 2008/0133776 | A1 | 6/2008 | Park et al. |
| 2015/0319203 | A1 | 11/2015 | Jeremias |
| 2016/0011845 | A1 | 1/2016 | Kuchoor |
| 2017/0330195 | A1 | 11/2017 | Lange et al. |
| 2018/0365680 | A1 | 12/2018 | Davis et al. |

FOREIGN PATENT DOCUMENTS

| | | |
|---|---|---|
| CN | 104202357 A | 12/2014 |
| CN | 109521918 A | 3/2019 |
| CN | 110321036 A | 10/2019 |
| JP | 2003-085090 A | 3/2003 |
| JP | 2014-071874 A | 4/2014 |
| WO | 2012/129400 A2 | 9/2012 |
| WO | 2017/105900 A2 | 6/2017 |

OTHER PUBLICATIONS

Office Action for Japanese Application No. 2022-521529 dated Oct. 11, 2022.
Written Opinion of the International Searching Authority and International Search Report for PCT Application No. PCT/CN2020/118652 dated Dec. 31, 2020.
First Search for Chinese Application No. 201910954054.4 dated Jun. 29, 2022.
International Preliminary Report on Patentability Chapter I for PCT Application No. PCT/CN2020/118652 dated Apr. 21, 2022.

* cited by examiner

CONTENT SHARING METHOD AND APPARATUS

CROSS-REFERENCE TO RELATED APPLICATIONS

This application is a continuation application of International Patent Application No. PCT/CN2020/118652, filed on Sep. 29, 2020, and entitled "CONTENT SHARING METHOD AND APPARATUS", which claims priority to Chinese Patent Application No. 201910954054.4, filed on Oct. 9, 2019 and entitled "CONTENT SHARING METHOD AND APPARATUS". The entire contents of all of the above applications are incorporated herein by reference in the entirety.

TECHNICAL FIELD

One or more embodiments of this specification relate to the field of Internet technologies, and in particular, to a content sharing method and apparatus.

BACKGROUND

In related technologies, data transmission can be realized between users based on a communication application, so that efficient communication is achieved between the users. For example, single chat may be established between users to realize one-to-one communication; and in order to improve the communication efficiency, group chat may be established to realize efficient communication among all the group members.

However, group communication is usually easily mixed with a large amount of content of small chats between members, and may even inundate some valuable content.

SUMMARY

In view of this, one or more embodiments of this specification provide a content sharing method and apparatus.

To achieve the foregoing objective, the one or more embodiments of this specification provide the following technical solutions.

According to a first aspect of the one or more embodiments of this specification, a content sharing method is provided, including: receiving, by a server, a content sharing request initiated by a sharing party user, where the content sharing request is used for sharing content to be shared, submitted by the sharing party user, in an organization where the sharing party user is located; and releasing, by the server, the content to be shared to the organization, so that the content to be shared is presented on a content sharing interface related to the organization.

According to a second aspect of the one or more embodiments of this specification, a content sharing method is provided, including: receiving, by a server, a content sharing request initiated by a sharing party user; and releasing, by the server, content to be shared, provided by the sharing party user, to an organization, so that the content to be shared is presented on a content sharing interface related to the organization.

According to a third aspect of the one or more embodiments of this specification, a content sharing method is provided, including: determining, by a terminal, content to be shared provided by a sharing party user and an organization where the sharing party user is located; and initiating, by the terminal, a content sharing request to a server, for the server to release the content to be shared to the organization, so that the content to be shared is presented on a content sharing interface related to the organization.

According to a fourth aspect of the one or more embodiments of this specification, a content sharing method is provided, including: displaying, by a terminal, a message sending/receiving interface of a group where a local end user is located, where the group corresponds to an organization where the local end user is located; and starting, by the terminal according to a trigger operation for an access entry included in the message sending/receiving interface, a content sharing interface related to the organization, where the content sharing interface is configured to display shared content of a member from the organization.

According to a fifth aspect of the one or more embodiments of this specification, a content sharing apparatus is provided, including: a request receiving unit, configured to enable a server to receive a content sharing request initiated by a sharing party user, where the content sharing request is used for sharing content to be shared, submitted by the sharing party user, in an organization where the sharing party user is located; and a content releasing unit, configured to enable the server to release the content to be shared to the organization, so that the content to be shared is presented on a content sharing interface related to the organization.

According to a sixth aspect of the one or more embodiments of this specification, a content sharing apparatus is provided, including: a request receiving unit, configured to enable a server to receive a content sharing request initiated by a sharing party user; and a content releasing unit, configured to enable the server to release content to be shared, provided by the sharing party user, to an organization, so that the content to be shared is presented on a content sharing interface related to the organization.

According to a seventh aspect of the one or more embodiments of this specification, a content sharing apparatus is provided, including: a determining unit, configured to enable a terminal to determine content to be shared provided by a sharing party user and an organization where the sharing party user is located; and a request unit, configured to enable the terminal to initiate a content sharing request to a server, for the server to release the content to be shared to the organization, so that the content to be shared is presented on a content sharing interface related to the organization.

According to an eighth aspect of the one or more embodiments of this specification, a content sharing apparatus is provided, including: a group interface display unit, configured to enable a terminal to display a message sending/receiving interface of a group where a local end user is located, where the group corresponds to an organization where the local end user is located; and a sharing interface display unit, configured to enable the terminal to start, according to a trigger operation for an access entry included in the message sending/receiving interface, a content sharing interface related to the organization, where the content sharing interface is configured to display shared content of a member from the organization.

According to a ninth aspect of the one or more embodiments of this specification, an electronic device is provided, including: a processor; and a memory configured to store instructions executable by the processor, where the processor is configured to execute the executable instructions to implement the method according to the first aspect or the second aspect.

According to a tenth aspect of the one or more embodiments of this specification, a computer-readable storage medium is provided, storing computer instructions, where the instructions are executed by a processor to implement steps in the method according to the first aspect or the second aspect.

According to an eleventh aspect of the one or more embodiments of this specification, an electronic device is provided, including: a processor; and a memory configured to store instructions executable by the processor, where the processor is configured to execute the executable instructions to implement the method according to the third aspect or the fourth aspect.

According to a twelfth aspect of the one or more embodiments of this specification, a computer-readable storage medium is provided, storing computer instructions, where the instructions are executed by a processor to implement steps in the method according to the third aspect or the fourth aspect.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments are not all the implementations consistent with one or more embodiments of this specification, but are instead only examples of apparatuses and methods that are described in detail in the appended claims and that are consistent with some aspects of one or more embodiments of this specification.

In some embodiments, the steps of corresponding methods are not necessarily performed according to a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

Figure 1:
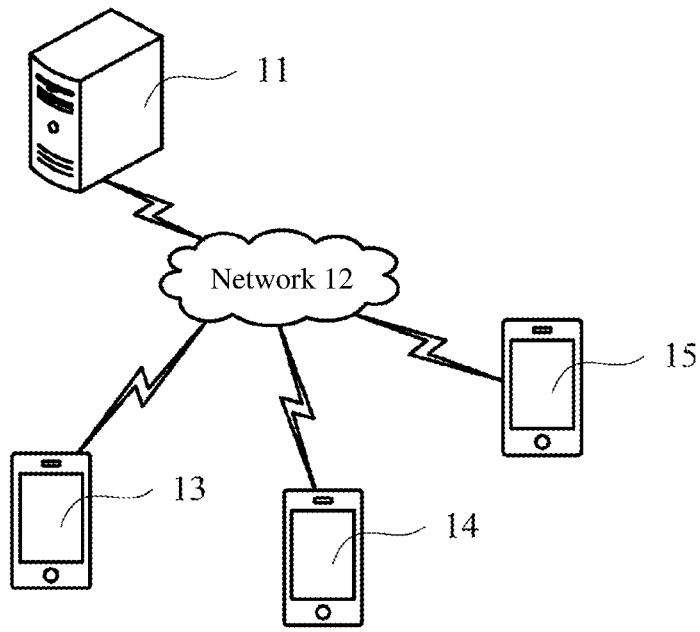
FIG. 1 is a schematic architectural diagram of a content sharing system, according to an exemplary embodiment.

FIG. 1 is a schematic architectural diagram of a content sharing system, according to an exemplary embodiment. As shown in FIG. 1, the system may include a server 11, a network 12, and several electronic devices such as a mobile phone 13, a mobile phone 14, and a mobile phone 15.

The server 11 may be a physical server including an independent host. Alternatively, the server 11 may be a virtual server carried by a host cluster. During running, the server 11 may run a program on a server side of an application, to achieve related service functions of the application. For example, when the server 11 runs a program of an instant messaging application, the server may be implemented as a server end of the instant messaging application.

In this embodiment, the instant messaging application may include an ordinary instant messaging application or an enterprise instant messaging application, which is not limited in this specification. The instant messaging application not only can implement a communication function, but also may be used as an integrated function platform of many other functions, for example, processing of an event of an institution such as an examination and approval event (for example, examination and approval events such as asking off, applying for office supplies, and financial affairs), an attendance checking event, a task event, or a log event, which is not limited in the one or more embodiments of this specification.

The mobile phones 13 to 15 are only a type of electronic devices that may be used by users. Actually, the users may alternatively use the following types of electronic devices obviously: a tablet device, a notebook computer, a personal digital assistant (PDA), a wearable device (such as smart glasses or a smartwatch), and the like. This is not limited in one or more embodiments of this specification. During running, the electronic device may run a program on a client side of an application, to achieve related service functions of the application. For example, when the electronic device runs a program of an instant messaging application, the electronic device may be implemented as a client of the instant messaging application.

An application of a client of the instant messaging application may be pre-installed on the electronic device, and then the client may start and run on the electronic device. When an online "client" of a technology such as HTML5 is used, the client may be obtained and run without installing a corresponding application on the electronic device.

The network 12 through which the mobile phones 13 to 15 and the server 11 interact with each other may include a plurality of types of wired or wireless networks. In an embodiment, the network 12 may include a public switched telephone network (PSTN) and the Internet. In addition, electronic devices such as the mobile phones 13 to 15 may also communicate and interact with each other through the network 12. For example, a single chat communication session is established between any two electronic devices; or several electronic devices may participate in the same group chat communication session, so that any user may send a communication message to other users in the group chat communication session by using an electronic device of the user.

Figure 2:
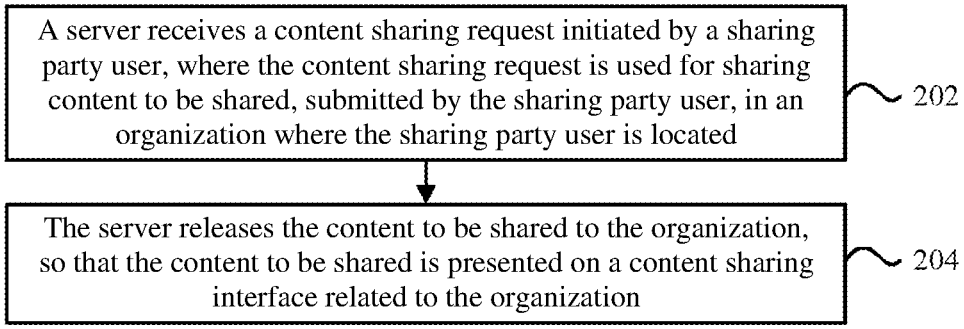
FIG. 2 is a flowchart of a content sharing method on a server side, according to an exemplary embodiment.

FIG. 2 is a flowchart of a content sharing method on a server side, according to an exemplary embodiment. As shown in FIG. 2, the method is applicable to a server (for example, a server 11 shown in FIG. 1), and may include the following steps:

Step 202: A server receives a content sharing request initiated by a sharing party user, where the content sharing request is used for sharing content to be shared, submitted by the sharing party user, in an organization where the sharing party user is located.

In an embodiment, a program on a server side of an application runs on the server, for the server to be configured as a server end of the application. Correspondingly, a program on a terminal side of the application runs on the terminal used by the sharing party user, for the terminal to be configured as a client of the application. Therefore, interaction may be implemented between the server and the terminal used by the sharing party user based on the foregoing application. For example, the application may be a communication application, for example, an instant messaging application or another type of communication application.

In an embodiment, the sharing party user is a user performing a content sharing operation. For example, the sharing party user intends to share the content to be shared to an organization where the sharing party user is located. Similarly, when another user intends to share content in an organization where the another user is located, the another user may also become the sharing party user. In other words, the sharing party user is a user role rather than a fixed user.

In an embodiment, the sharing party user may add the content to be shared to a content sharing request, to send the content sharing request to the server. Alternatively, the sharing party user may independently send the content to be shared and the content sharing request to the server. Alternatively, the sharing party user may send the content to be shared to a storage space (for example, a storage space maintained by the server or another storage space accessible to the server) in advance, and instruct, by using the content sharing request, the server to obtain the content to be shared from the storage space.

In an embodiment, the sharing party user may be any member in the organization. In other words, each member in the organization may be used as the sharing party user to share content for the organization.

In an embodiment, the sharing party user may be a member having a sharing permission in the organization. In other words, permissions of different members in the organization may be different, so that the members having sharing permissions may be used as the foregoing sharing party user, to share content for the organization; and other members having no sharing permission cannot share content for the organization. For example, the members of the organization may include an administrator and ordinary members. The administrator may have a sharing permission, and may give or revoke a sharing permission to at least one ordinary member. In another example, the organization has a corresponding organization structure, and each member is at a corresponding level in the organization structure, so that a member at a corresponding level not lower than a preset level may have a sharing permission, and a member at a corresponding level lower than the preset level has no sharing permission. In another example, the organization may have an associated test task. When completing the test task, a member may automatically obtain a sharing permission. The members in the organization may alternatively obtain sharing permissions in other manners, which is not limited in this specification.

In an embodiment, the content to be shared may include any type of content, such as text, a picture, a video, an audio, or a table, which is not limited in this specification.

In an embodiment, the members in the organization of this specification may have a relatively close mutual relationship. To distinguish from loose relationships in scenarios such as a community (for example, a bulletin board system (BBS)) and a post bar in related technologies, when releasing content to be shared, members need to take consideration for the relatively close mutual relationship, and actively avoid releasing inappropriate content to be shared, so that content sharing between the members are more efficient and controllable.

In an embodiment, the members in the organization meet a predefined user relationship, to reflect the relatively close mutual relationship. For example, the predefined user relationship may include: belonging to a same institution. The institution herein may be understood as an enterprise, a hospital, a school, a troop, a government institution, a department in the foregoing types of institutions, or the like. This is not limited in this specification. In another example, the predefined user relationship may include: participating in a same event. The event may include a task event, a conference event, a diagnosis and treatment event, an instructional event, and the like. The user relationship may further include other types of relatively close mutual relationships. For example, there is a friend relationship or cooperation relationship between members. Alternatively, the user relationship may simultaneously meet the foregoing plurality of relationships (for example, simultaneously belonging to the same institution and participating in the same event; and in another example, simultaneously having a cooperation relationship and participating in the same event), which is not limited in this specification.

In an embodiment, the organization may be established based on an existing institution. For example, for an existing enterprise, the organization may be established based on an organization structure of the enterprise maintained by a server, so that members of the enterprise are added as members of the organization, and an organization structure formed by members of the organization may be the same as (or may be different from) the organization structure formed by the members of the enterprise. For example, an administrator of the enterprise may initiate an organization establishment request to the server, for the server to establish the organization based on the organization structure of the enterprise.

In an embodiment, a join form of the organization may be invite-only. For example, an applicant user may initiate a join request for the organization to the server, and the server may add the applicant user to the organization based on the received join request when determining that the applicant user initiates the join request based on a join invitation sent by a member of the organization; otherwise, the server refuses to add. In other words, only when a member of the organization sends a join invitation to an applicant user, and the applicant user initiates a join request based on the join invitation, the server agrees to the request of the applicant user and adds the applicant user to the organization. When the applicant user directly sends a join request for the organization without receiving a join invitation, the server will refuse the join request.

Step 204: The server releases the content to be shared to the organization, so that the content to be shared is presented on a content sharing interface related to the organization.

In an embodiment, compared with releasing content to be shared in an associated group corresponding to the organization in related technologies, by presenting the content to be shared in the content sharing interface related to the organization after the server releases the content to be shared to the organization, all shared content can be uniformly displayed in the content sharing interface, and an impact of content of small chats between group members on the displayed content can be avoided, to ensure that the members of the organization can view the shared content more conveniently, thereby helping improve content delivery efficiency.

In an embodiment, the content sharing interface related to the organization means that there is a preset association between the content sharing interface and the organization. For example, the organization has only one related content sharing interface, and the content sharing interface corresponds to the entire organization, so that when any member releases content to be shared to the organization (assuming that the any member has a sharing permission), the content to be shared is presented on the content sharing interface. In another example, the organization may include at least one sub-level organization. A relationship between the organization and the at least one sub-level organization is similar to a relationship between an enterprise and departments, a hospital and departments, a school and classes, or the like. The content sharing interface related to the organization may include: a content sharing general-interface corresponding to the organization, at least one content sharing sub-interface corresponding to the at least one sub-level organization. That is, the content sharing general-interface corresponds to the entire organization, and a content sharing sub-interface corresponds to a sub-level organization (that is, a part of the entire organization). The organization may include a plurality of sub-level organizations. The sub-level organizations may be independent of each other, or there may be at least a part of overlap, and some sub-level organizations at relatively high levels may even completely include one or more other lower-level sub-level organizations. For example, in an enterprise scenario, a development department corresponds to a sub-level organization 1, a subordinate software development department of the development department corresponds to a sub-level organization 2, and a subordinate hardware development department of the development department corresponds to a sub-level organization 3, then the sub-level organization 1 may be considered to include the sub-level organization 2 and the sub-level organization 3, and the sub-level organization 2 and the sub-level organization 3 are independent of each other.

In an embodiment, in a case that both the content sharing general-interface and the at least one content sharing sub-interface exist, for the content sharing request initiated by the sharing party user, the content to be shared may be released to the organization or a sub-level organization of the organization, so as to be presented on the content sharing general-interface or a content sharing sub-interface. For example, the server may determine, according to a permission level of the sharing party user, whether to release the content to be shared to the organization or a sub-level organization of the organization. In a case that the permission level of the sharing party user matches a permission level requirement corresponding to the organization (in this case, the permission level of the sharing party user usually also matches a permission level requirement corresponding a sub-level organization), the server may release the content to be shared to the organization by default, to present the content to be shared on the content sharing general-interface. In a case that the permission level of the sharing party user matches a permission level requirement corresponding to a sub-level organization (the sharing party user may be located in the sub-level organization or not) but does not match the permission level requirement corresponding to the organization, the server may release the content to be shared to the sub-level organization of the organization by default, to present the content to be shared on a corresponding content sharing sub-interface. In another example, the server may determine, according to configuration information of the sharing party user, whether to release the content to be shared to the organization or a sub-level organization where the sharing party user is located, to present the content to be shared on the content sharing general-interface or a content sharing sub-interface corresponding to the sub-level organization where the sharing party user is located. In other words, a permission level of the sharing party user may match a permission level requirement corresponding to the organization, but the sharing party user may still release, by setting the configuration information, the content to be shared to the sub-level organization where the sharing party user is located, to present the content to be shared on the corresponding content sharing sub-interface, instead of releasing the content to be shared to the organization to present the content to be shared on the corresponding content sharing general-interface.

In an embodiment, the content sharing general-interface and the at least one content sharing sub-interface have corresponding access permissions, so as to be only accessible to users having the corresponding access permissions. For example, whether a user can access a corresponding content sharing interface may be determined according to a belonging situation of the user for the organization or a sub-level organization. An access permission of the content sharing general-interface may be limited to all the members of the organization. That is, because the members belong to the organization, the members have access permissions for the content sharing general-interface corresponding to the organization, and users not belonging to the organization cannot access the content sharing general-interface. An access permission of a content sharing sub-interface may be limited to members of a corresponding sub-level organization. That is, because the members belong to the sub-level organization, the members have access permissions for the content sharing sub-interface corresponding to the sub-level organization, and users not belonging to the sub-level organization cannot access the content sharing sub-interface even if the users belong to the organization. Whether a user have a permission to access a corresponding content sharing interface may alternatively be determined in other manners. For example, for the content sharing sub-interface corresponding to the foregoing sub-level organization, all the members of the organization may be set to have access permissions, which is not limited in this specification.

In an embodiment, the server may establish an associated group for the organization, for group members to have a one-to-one correspondence with the members of the organization, thereby facilitating the members of the organization in performing efficient communication based on the associated group. Similarly, for an existing group, the server may also establish a corresponding organization for the group. For the organization and the associated group thereof, interaction may be realized between the content sharing interface related to the organization and the message sending/receiving interface (alternatively referred to as "messaging interface") of the associated group, to facilitate the members in realizing quick interface switching. For example, the message sending/receiving interface of the associated group may include an access entry for the content sharing interface, and vice versa, an access entry for the message sending/receiving interface may alternatively be added to the content sharing interface. In some embodiments, there may be one associated group, and members of the associated group are all the members of the organization; or there may be a plurality of associated groups, and all the members of the organization are separately located in the associated groups.

In an embodiment, in addition to presenting the content to be shared, that the sharing party user needs to share, on the content sharing interface related to the organization, the server may further send the content to be shared to the associated group of the organization, so that members may choose to view the content to be shared on the content sharing interface or the message sending/receiving interface. For example, a member already located on the message sending/receiving interface can quickly view the content to be shared on the message sending/receiving interface without having to switch to the content sharing interface and search in the content sharing interface for the content to be shared. The server may alternatively improve convenience in viewing the content to be shared for members in other manners. For example, the server may send an access link of the content to be shared in the content sharing interface to the associated group of the organization, so that although a member cannot directly view the content to be shared in the message sending/receiving interface, the member can quickly jump to and view the content to be shared by simply triggering the access link in the message sending/receiving interface without having to search in the content sharing interface for the content to be shared.

Figure 3:
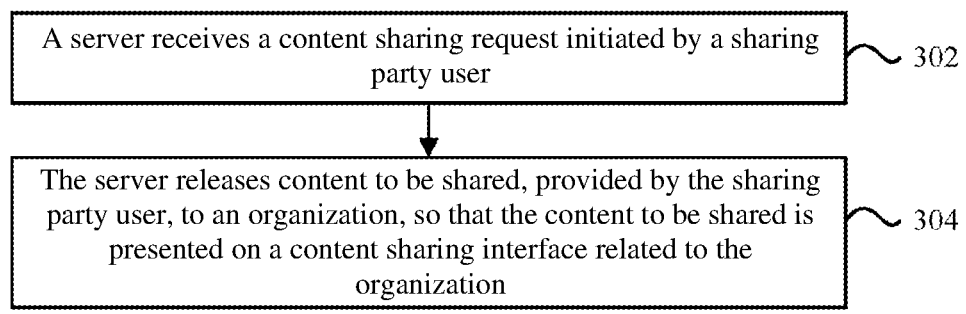
FIG. 3 is another flowchart of a content sharing method on a server side, according to an exemplary embodiment.

FIG. 3 is another flowchart of a content sharing method on a server side, according to an exemplary embodiment. As shown in FIG. 3, the method is applicable to a server (for example, a server 11 shown in FIG. 1), and may include the following steps:

Step 302: A server receives a content sharing request initiated by a sharing party user.

In an embodiment, a program on a server side of an application runs on the server, for the server to be configured as a server end of the application. Correspondingly, a program on a terminal side of the application runs on the terminal used by the sharing party user, for the terminal to be configured as a client of the application. Therefore, interaction may be implemented between the server and the terminal used by the sharing party user based on the foregoing application. For example, the application may be a communication application, for example, an instant messaging application or another type of communication application.

In an embodiment, the sharing party user is a user performing a content sharing operation. For example, the sharing party user intends to share the content to be shared to an organization where the sharing party user is located. Similarly, when another user intends to share content in an organization where the another user is located, the another user may also become the sharing party user. In other words, the sharing party user is a user role rather than a fixed user. In some cases, the sharing party user does not belong to the organization, but the sharing party user may still enable, in a sharing manner, the members of the organization to view the content to be shared.

In an embodiment, the sharing party user may add the content to be shared to a content sharing request, to send the content sharing request to the server. Alternatively, the sharing party user may independently send the content to be shared and the content sharing request to the server. Alternatively, the sharing party user may send the content to be shared to a storage space (for example, a storage space maintained by the server or another storage space accessible to the server) in advance, and instruct, by using the content sharing request, the server to obtain the content to be shared from the storage space.

In an embodiment, the content to be shared may include any type of content, such as text, a picture, a video, an audio, or a table, which is not limited in this specification.

In an embodiment, in a case of belonging to the organization, the sharing party user may be any member in the organization. In other words, each member in the organization may be used as the sharing party user to share content for the organization.

In an embodiment, the sharing party user may be a member having a sharing permission in the organization. In other words, permissions of different members in the organization may be different, so that the members having sharing permissions may be used as the foregoing sharing party user, to share content for the organization; and other members having no sharing permission cannot share content for the organization. For example, the members of the organization may include an administrator and ordinary members. The administrator may have a sharing permission, and may give or revoke a sharing permission to at least one ordinary member. In another example, the organization has a corresponding organization structure, and each member is at a corresponding level in the organization structure, so that a member at a corresponding level not lower than a preset level may have a sharing permission, and a member at a corresponding level lower than the preset level has no sharing permission. In another example, the organization may have an associated test task. When completing the test task, a member may automatically obtain a sharing permission. The members in the organization may alternatively obtain sharing permissions in other manners, which is not limited in this specification.

In an embodiment, the members in the organization of this specification may have a relatively close mutual relationship. To distinguish from loose relationships in scenarios such as a community (for example, a bulletin board system (BBS)) and a post bar in related technologies, when releasing content to be shared, members need to take consideration for the relatively close mutual relationship, and actively avoid releasing inappropriate content to be shared, so that content sharing between the members are more efficient and controllable.

In an embodiment, the members in the organization meet a predefined user relationship, to reflect the relatively close mutual relationship. For example, the predefined user relationship may include: belonging to a same institution. The institution herein may be understood as an enterprise, a hospital, a school, a troop, a government institution, a department in the foregoing types of institutions, or the like. This is not limited in this specification. In another example, the predefined user relationship may include: participating in a same event. The event may include a task event, a conference event, a diagnosis and treatment event, an instructional event, and the like. The user relationship may further include other types of relatively close mutual relationships. For example, there is a friend relationship or cooperation relationship between members. Alternatively, the user relationship may simultaneously meet the foregoing plurality of relationships (for example, simultaneously belonging to the same institution and participating in the same event; and in another example, simultaneously having a cooperation relationship and participating in the same event), which is not limited in this specification.

In an embodiment, the organization may be established based on an existing institution. For example, for an existing enterprise, the organization may be established based on an organization structure of the enterprise maintained by a server, so that members of the enterprise are added as members of the organization, and an organization structure formed by members of the organization may be the same as (or may be different from) the organization structure formed by the members of the enterprise. For example, an administrator of the enterprise may initiate an organization establishment request to the server, for the server to establish the organization based on the organization structure of the enterprise.

In an embodiment, a join form of the organization may be invite-only. For example, an applicant user may initiate a join request for the organization to the server, and the server may add the applicant user to the organization based on the received join request when determining that the applicant user initiates the join request based on a join invitation sent by a member of the organization; otherwise, the server refuses to add. In other words, only when a member of the organization sends a join invitation to an applicant user, and the applicant user initiates a join request based on the join invitation, the server agrees to the request of the applicant user and adds the applicant user to the organization. When the applicant user directly sends a join request for the organization without receiving a join invitation, the server will refuse the join request.

Step 304: The server releases content to be shared, provided by the sharing party user, to an organization, so that the content to be shared is presented on a content sharing interface related to the organization.

In an embodiment, compared with releasing content to be shared in an associated group corresponding to the organization in related technologies, by presenting the content to be shared in the content sharing interface related to the organization after the server releases the content to be shared to the organization, all shared content can be uniformly displayed in the content sharing interface, and an impact of content of small chats between group members on the displayed content can be avoided, to ensure that the members of the organization can view the shared content more conveniently, thereby helping improve content delivery efficiency.

In an embodiment, the content sharing interface related to the organization means that there is a preset association between the content sharing interface and the organization. For example, the organization has only one related content sharing interface, and the content sharing interface corresponds to the entire organization, so that when any member releases content to be shared to the organization (assuming that the any member has a sharing permission), the content to be shared is presented on the content sharing interface. In another example, the organization may include at least one sub-level organization. A relationship between the organization and the at least one sub-level organization is similar to a relationship between an enterprise and departments, a hospital and departments, a school and classes, or the like. The content sharing interface related to the organization may include: a content sharing general-interface corresponding to the organization, at least one content sharing sub-interface corresponding to the at least one sub-level organization. That is, the content sharing general-interface corresponds to the entire organization, and a content sharing sub-interface corresponds to a sub-level organization (that is, a part of the entire organization). The organization may include a plurality of sub-level organizations. The sub-level organizations may be independent of each other, or there may be at least a part of overlap, and some sub-level organizations at relatively high levels may even completely include one or more other lower-level sub-level organizations. For example, in an enterprise scenario, a development department corresponds to a sub-level organization 1, a subordinate software development department of the development department corresponds to a sub-level organization 2, and a subordinate hardware development department of the development department corresponds to a sub-level organization 3, then the sub-level organization 1 may be considered to include the sub-level organization 2 and the sub-level organization 3, and the sub-level organization 2 and the sub-level organization 3 are independent of each other.

In an embodiment, in a case that both the content sharing general-interface and the at least one content sharing sub-interface exist, for the content sharing request initiated by the sharing party user, the content to be shared may be released to the organization or a sub-level organization of the organization, so as to be presented on the content sharing general-interface or a content sharing sub-interface. For example, the server may determine, according to a permission level of the sharing party user, whether to release the content to be shared to the organization or a sub-level organization of the organization. In a case that the permission level of the sharing party user matches a permission level requirement corresponding to the organization (in this case, the permission level of the sharing party user usually also matches a permission level requirement corresponding a sub-level organization), the server may release the content to be shared to the organization by default, to present the content to be shared on the content sharing general-interface. In a case that the permission level of the sharing party user matches a permission level requirement corresponding to a sub-level organization (the sharing party user may be located in the sub-level organization or not) but does not match the permission level requirement corresponding to the organization, the server may release the content to be shared to the sub-level organization of the organization by default, to present the content to be shared on a corresponding content sharing sub-interface. In another example, the server may determine, according to configuration information of the sharing party user, whether to release the content to be shared to the organization or a sub-level organization where the sharing party user is located, to present the content to be shared on the content sharing general-interface or a content sharing sub-interface corresponding to the sub-level organization where the sharing party user is located. In other words, a permission level of the sharing party user may match a permission level requirement corresponding to the organization, but the sharing party user may still release, by setting the configuration information, the content to be shared to the sub-level organization where the sharing party user is located, to present the content to be shared on the corresponding content sharing sub-interface, instead of releasing the content to be shared to the organization to present the content to be shared on the corresponding content sharing general-interface.

In an embodiment, the content sharing general-interface and the at least one content sharing sub-interface have corresponding access permissions, so as to be only accessible to users having the corresponding access permissions. For example, whether a user can access a corresponding content sharing interface may be determined according to a belonging situation of the user for the organization or a sub-level organization. An access permission of the content sharing general-interface may be limited to all the members of the organization. That is, because the members belong to the organization, the members have access permissions for the content sharing general-interface corresponding to the organization, and users not belonging to the organization cannot access the content sharing general-interface. An access permission of a content sharing sub-interface may be limited to members of a corresponding sub-level organization. That is, because the members belong to the sub-level organization, the members have access permissions for the content sharing sub-interface corresponding to the sub-level organization, and users not belonging to the sub-level organization cannot access the content sharing sub-interface even if the users belong to the organization. Whether a user have a permission to access a corresponding content sharing interface may alternatively be determined in other manners. For example, for the content sharing sub-interface corresponding to the foregoing sub-level organization, all the members of the organization may be set to have access permissions, which is not limited in this specification.

In an embodiment, the server may establish an associated group for the organization, for group members to have a one-to-one correspondence with the members of the organization, thereby facilitating the members of the organization in performing efficient communication based on the associated group. Similarly, for an existing group, the server may also establish a corresponding organization for the group. For the organization and the associated group thereof, interaction may be realized between the content sharing interface related to the organization and the message sending/receiving interface of the associated group, to facilitate the members in realizing quick interface switching. For example, the message sending/receiving interface of the associated group may include an access entry for the content sharing interface, and vice versa, an access entry for the message sending/receiving interface may alternatively be added to the content sharing interface. In some embodiments, there may be one associated group, and members of the associated group are all the members of the organization; or there may be a plurality of associated groups, and all the members of the organization are separately located in the associated groups.

In an embodiment, in addition to presenting the content to be shared, that the sharing party user needs to share, on the content sharing interface related to the organization, the server may further send the content to be shared to the associated group of the organization, so that members may choose to view the content to be shared on the content sharing interface or the message sending/receiving interface. For example, a member already located on the message sending/receiving interface can quickly view the content to be shared on the message sending/receiving interface without having to switch to the content sharing interface and search in the content sharing interface for the content to be shared. The server may alternatively improve convenience in viewing the content to be shared for members in other manners. For example, the server may send an access link of the content to be shared in the content sharing interface to the associated group of the organization, so that although a member cannot directly view the content to be shared in the message sending/receiving interface, the member can quickly jump to and view the content to be shared by simply triggering the access link in the message sending/receiving interface without having to search in the content sharing interface for the content to be shared.

Figure 4:
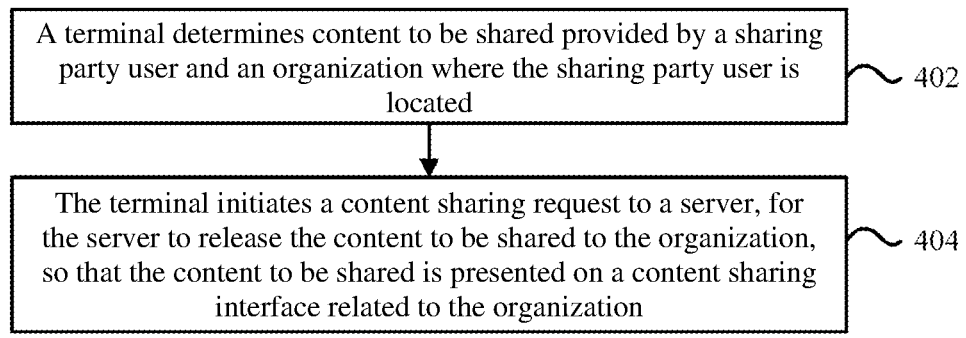
FIG. 4 is a flowchart of a content sharing method on a terminal side, according to an exemplary embodiment.

FIG. 4 is a flowchart of a content sharing method on a terminal side, according to an exemplary embodiment. As shown in FIG. 4, the method is applicable to a terminal (for example, mobile phones 13 to 15 shown in FIG. 1), and may include the following steps:

Step 402: A terminal determines content to be shared provided by a sharing party user and an organization where the sharing party user is located.

In an embodiment, the sharing party user is a user performing a content sharing operation. For example, the sharing party user intends to share the content to be shared to an organization where the sharing party user is located. Similarly, when another user intends to share content in an organization where the another user is located, the another user may also become the sharing party user. In other words, the sharing party user is a user role rather than a fixed user. From the perspective of the terminal, the sharing party user is a user performing a sharing operation on the terminal, and the sharing party user usually needs to log in to the terminal with account information pre-registered by the sharing party user. That is, the terminal distinguishes identities of corresponding users based on logged-in account information.

In an embodiment, the content to be shared may include any type of content, such as text, a picture, a video, an audio, or a table, which is not limited in this specification.

In an embodiment, the members in the organization of this specification may have a relatively close mutual relationship. To distinguish from loose relationships in scenarios such as a community (for example, a bulletin board system (BBS)) and a post bar in related technologies, when releasing content to be shared, members need to take consideration for the relatively close mutual relationship, and actively avoid releasing inappropriate content to be shared, so that content sharing between the members are more efficient and controllable.

In an embodiment, the members in the organization meet a predefined user relationship, to reflect the relatively close mutual relationship. For example, the predefined user relationship may include: belonging to a same institution. The institution herein may be understood as an enterprise, a hospital, a school, a troop, a government institution, a department in the foregoing types of institutions, or the like. This is not limited in this specification. In another example, the predefined user relationship may include: participating in a same event. The event may include a task event, a conference event, a diagnosis and treatment event, an instructional event, and the like. The user relationship may further include other types of relatively close mutual relationships. For example, there is a friend relationship or a cooperation relationship between members. Alternatively, the user relationship may simultaneously meet the foregoing plurality of relationships (for example, simultaneously belonging to the same institution and participating in the same event; and in another example, simultaneously having a cooperation relationship and participating in the same event), which is not limited in this specification.

In an embodiment, the organization may be established based on an existing institution. For example, for an existing enterprise, the organization may be established based on an organization structure of the enterprise maintained by a server, so that members of the enterprise are added as members of the organization, and an organization structure formed by members of the organization may be the same as (or may be different from) the organization structure formed by the members of the enterprise. For example, an administrator of the enterprise may initiate an organization establishment request to the server, for the server to establish the organization based on the organization structure of the enterprise.

In an embodiment, a join form of the organization may be invite-only. For example, an applicant user may initiate a join request for the organization to the server, and the server may add the applicant user to the organization based on the received join request when determining that the applicant user initiates the join request based on a join invitation sent by a member of the organization; otherwise, the server refuses to add. In other words, only when a member of the organization sends a join invitation to an applicant user, and the applicant user initiates a join request based on the join invitation, the server agrees to the request of the applicant user and adds the applicant user to the organization. When the applicant user directly sends a join request for the organization without receiving a join invitation, the server will refuse the join request.

Step 404: The terminal initiates a content sharing request to a server, for the server to release the content to be shared to the organization, so that the content to be shared is presented on a content sharing interface related to the organization.

In an embodiment, a program on a server side of an application runs on the server, for the server to be configured as a server end of the application. Correspondingly, a program on a terminal side of the application runs on the terminal used by the sharing party user, for the terminal to be configured as a client of the application. Therefore, interaction may be implemented between the server and the terminal used by the sharing party user based on the foregoing application. For example, the application may be a communication application, for example, an instant messaging application or another type of communication application.

In an embodiment, the terminal may add the content to be shared to a content sharing request, to send the content sharing request to the server. Alternatively, the terminal may independently send the content to be shared and the content sharing request to the server. Alternatively, the terminal may send the content to be shared to a storage space (for example, a storage space maintained by the server or another storage space accessible to the server) in advance, and instruct, by using the content sharing request, the server to obtain the content to be shared from the storage space.

In an embodiment, the sharing party user may be any member in the organization. In other words, each member in the organization may be used as the sharing party user to share content for the organization.

In an embodiment, the sharing party user may be a member having a sharing permission in the organization. In other words, permissions of different members in the organization may be different, so that the members having sharing permissions may be used as the foregoing sharing party user, to share content for the organization; and other members having no sharing permission cannot share content for the organization. For example, the members of the organization may include an administrator and ordinary members. The administrator may have a sharing permission, and may give or revoke a sharing permission to at least one ordinary member. In another example, the organization has a corresponding organization structure, and each member is at a corresponding level in the organization structure, so that a member at a corresponding level not lower than a preset level may have a sharing permission, and a member at a corresponding level lower than the preset level has no sharing permission. In another example, the organization may have an associated test task. When completing the test task, a member may automatically obtain a sharing permission. The members in the organization may alternatively obtain sharing permissions in other manners, which is not limited in this specification.

In an embodiment, compared with releasing content to be shared in an associated group corresponding to the organization in related technologies, by presenting the content to be shared in the content sharing interface related to the organization after the server releases the content to be shared to the organization, all shared content can be uniformly displayed in the content sharing interface, and an impact of content of small chats between group members on the displayed content can be avoided, to ensure that the members of the organization can view the shared content more conveniently, thereby helping improve content delivery efficiency.

In an embodiment, the content sharing interface related to the organization means that there is a preset association between the content sharing interface and the organization. For example, the organization has only one related content sharing interface, and the content sharing interface corresponds to the entire organization, so that when any member releases content to be shared to the organization (assuming that the any member has a sharing permission), the content to be shared is presented on the content sharing interface. In another example, the organization may include at least one sub-level organization. A relationship between the organization and the at least one sub-level organization is similar to a relationship between an enterprise and departments, a hospital and departments, a school and classes, or the like. The content sharing interface related to the organization may include: a content sharing general-interface corresponding to the organization, at least one content sharing sub-interface corresponding to the at least one sub-level organization. That is, the content sharing general-interface corresponds to the entire organization, and a content sharing sub-interface corresponds to a sub-level organization (that is, a part of the entire organization). The organization may include a plurality of sub-level organizations. The sub-level organizations may be independent of each other, or there may be at least a part of overlap, and some sub-level organizations at relatively high levels may even completely include one or more other lower-level sub-level organizations. For example, in an enterprise scenario, a development department corresponds to a sub-level organization 1, a subordinate software development department of the development department corresponds to a sub-level organization 2, and a subordinate hardware development department of the development department corresponds to a sub-level organization 3, then the sub-level organization 1 may be considered to include the sub-level organization 2 and the sub-level organization 3, and the sub-level organization 2 and the sub-level organization 3 are independent of each other.

In an embodiment, in a case that both the content sharing general-interface and the at least one content sharing sub-interface exist, for the content sharing request initiated by the sharing party user, the content to be shared may be released to the organization or a sub-level organization of the organization, so as to be presented on the content sharing general-interface or a content sharing sub-interface. For example, the server may determine, according to a permission level of the sharing party user, whether to release the content to be shared to the organization or a sub-level organization of the organization. In a case that the permission level of the sharing party user matches a permission level requirement corresponding to the organization (in this case, the permission level of the sharing party user usually also matches a permission level requirement corresponding a sub-level organization), the server may release the content to be shared to the organization by default, to present the content to be shared on the content sharing general-interface. In a case that the permission level of the sharing party user matches a permission level requirement corresponding to a sub-level organization (the sharing party user may be located in the sub-level organization or not) but does not match the permission level requirement corresponding to the organization, the server may release the content to be shared to the sub-level organization of the organization by default, to present the content to be shared on a corresponding content sharing sub-interface. In another example, the server may determine, according to configuration information of the sharing party user, whether to release the content to be shared to the organization or a sub-level organization where the sharing party user is located, to present the content to be shared on the content sharing general-interface or a content sharing sub-interface corresponding to the sub-level organization where the sharing party user is located. In other words, a permission level of the sharing party user may match a permission level requirement corresponding to the organization, but the sharing party user may still release, by setting the configuration information, the content to be shared to the sub-level organization where the sharing party user is located, to present the content to be shared on the corresponding content sharing sub-interface, instead of releasing the content to be shared to the organization to present the content to be shared on the corresponding content sharing general-interface.

In an embodiment, the content sharing general-interface and the at least one content sharing sub-interface have corresponding access permissions, so as to be only accessible to users having the corresponding access permissions. For example, whether a user can access a corresponding content sharing interface may be determined according to a belonging situation of the user for the organization or a sub-level organization. An access permission of the content sharing general-interface may be limited to all the members of the organization. That is, because the members belong to the organization, the members have access permissions for the content sharing general-interface corresponding to the organization, and users not belonging to the organization cannot access the content sharing general-interface. An access permission of a content sharing sub-interface may be limited to members of a corresponding sub-level organization. That is, because the members belong to the sub-level organization, the members have access permissions for the content sharing sub-interface corresponding to the sub-level organization, and users not belonging to the sub-level organization cannot access the content sharing sub-interface even if the users belong to the organization. Whether a user have a permission to access a corresponding content sharing interface may alternatively be determined in other manners. For example, for the content sharing sub-interface corresponding to the foregoing sub-level organization, all the members of the organization may be set to have access permissions, which is not limited in this specification.

In an embodiment, the server may establish an associated group for the organization, for group members to have a one-to-one correspondence with the members of the organization, thereby facilitating the members of the organization in performing efficient communication based on the associated group. Similarly, for an existing group, the server may also establish a corresponding organization for the group. For the organization and the associated group thereof, interaction may be realized between the content sharing interface related to the organization and the message sending/receiving interface of the associated group, to facilitate the members in realizing quick interface switching. For example, the message sending/receiving interface of the associated group may include an access entry for the content sharing interface, and vice versa, an access entry for the message sending/receiving interface may alternatively be added to the content sharing interface. In some embodiments, there may be one associated group, and members of the associated group are all the members of the organization; or there may be a plurality of associated groups, and all the members of the organization are separately located in the associated groups.

In an embodiment, the message sending/receiving interface and the content sharing interface belong to a same application, for example, both belong to the foregoing communication application. When the terminal starts, according to a trigger operation for an access entry included in the message sending/receiving interface, a content sharing interface related to the organization, there may be a plurality of displaying manners. For example, in a case that the message sending/receiving interface and the content sharing interface are completely independent of each other, it is equivalent that the terminal jumps from the message sending/receiving interface to the content sharing interface, that is, a screen of the terminal only displays the message sending/receiving interface or the content sharing interface at the same time point. In another example, the terminal may display the content sharing interface above the message sending/receiving interface in a floating manner. In another example, the terminal may display the message sending/receiving interface and the content sharing interface side by side.

In an embodiment, in addition to presenting the content to be shared, that the sharing party user needs to share, on the content sharing interface related to the organization, the server may further send the content to be shared to the associated group of the organization, so that members may choose to view the content to be shared on the content sharing interface or the message sending/receiving interface. For example, a member already located on the message sending/receiving interface can quickly view the content to be shared on the message sending/receiving interface without having to switch to the content sharing interface and search in the content sharing interface for the content to be shared. The server may alternatively improve convenience in viewing the content to be shared for members in other manners. For example, the server may send an access link of the content to be shared in the content sharing interface to the associated group of the organization, so that although a member cannot directly view the content to be shared in the message sending/receiving interface, the member can quickly jump to and view the content to be shared by simply triggering the access link in the message sending/receiving interface without having to search in the content sharing interface for the content to be shared.

Figure 5:
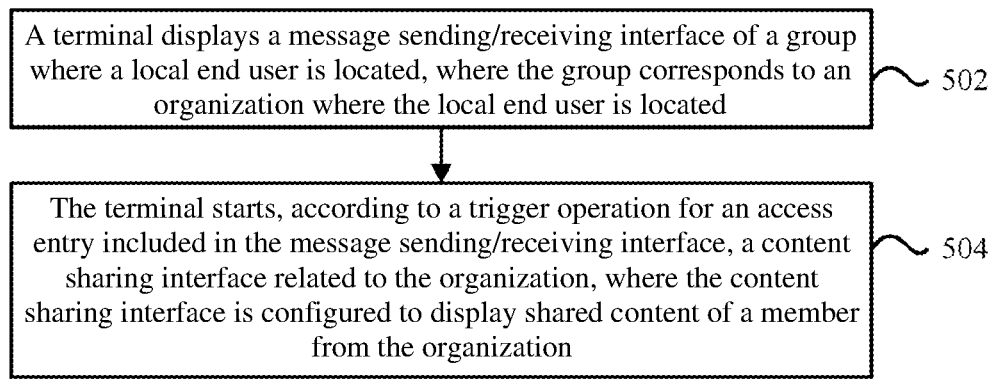
FIG. 5 is another flowchart of a content sharing method on a terminal side, according to an exemplary embodiment.

FIG. 5 is another flowchart of a content sharing method on a terminal side, according to an exemplary embodiment. As shown in FIG. 5, the method is applicable to a terminal (for example, mobile phones 13 to 15 shown in FIG. 1), and may include the following steps:

Step 502: A terminal displays a message sending/receiving interface of a group where a local end user is located, where the group corresponds to an organization where the local end user is located.

In an embodiment, the local end user is a user corresponding to a logged-in account on the terminal. The message sending/receiving interface is configured for the local end user to view a communication message sent by another member in the group where the local end user is located, or send a communication message to another member.

In an embodiment, the members in the organization of this specification may have a relatively close mutual relationship. To distinguish from loose relationships in scenarios such as a community (for example, a bulletin board system (BBS)) and a post bar in related technologies, when releasing content to be shared, members need to take consideration for the relatively close mutual relationship, and actively avoid releasing inappropriate content to be shared, so that content sharing between the members are more efficient and controllable.

In an embodiment, the members in the organization meet a predefined user relationship, to reflect the relatively close mutual relationship. For example, the predefined user relationship may include: belonging to a same institution. The institution herein may be understood as an enterprise, a hospital, a school, a troop, a government institution, a department in the foregoing types of institutions, or the like. This is not limited in this specification. In another example, the predefined user relationship may include: participating in a same event. The event may include a task event, a conference event, a diagnosis and treatment event, an instructional event, and the like. The user relationship may further include other types of relatively close mutual relationships. For example, there is a friend relationship or cooperation relationship between members. Alternatively, the user relationship may simultaneously meet the foregoing plurality of relationships (for example, simultaneously belonging to the same institution and participating in the same event; and in another example, simultaneously having a cooperation relationship and participating in the same event), which is not limited in this specification.

In an embodiment, the organization may be established based on an existing institution. For example, for an existing enterprise, the organization may be established based on an organization structure of the enterprise maintained by a server, so that members of the enterprise are added as members of the organization, and an organization structure formed by members of the organization may be the same as (or may be different from) the organization structure formed by the members of the enterprise. For example, an administrator of the enterprise may initiate an organization establishment request to the server, for the server to establish the organization based on the organization structure of the enterprise.

In an embodiment, a join form of the organization may be invite-only. For example, an applicant user may initiate a join request for the organization to the server, and the server may add the applicant user to the organization based on the received join request when determining that the applicant user initiates the join request based on a join invitation sent by a member of the organization; otherwise, the server refuses to add. In other words, only when a member of the organization sends a join invitation to an applicant user, and the applicant user initiates a join request based on the join invitation, the server agrees to the request of the applicant user and adds the applicant user to the organization. When the applicant user directly sends a join request for the organization without receiving a join invitation, the server will refuse the join request.

Step 504: The terminal starts, according to a trigger operation for an access entry included in the message sending/receiving interface, a content sharing interface related to the organization, where the content sharing interface is configured to display shared content of a member from the organization.

In an embodiment, by adding the access entry for the content sharing interface to the message sending/receiving interface, the local end user may quickly start the content sharing interface by triggering the access entry without having to exit from the message sending/receiving interface and then open the content sharing interface. The content sharing interface may be independent of the message sending/receiving interface, so that the terminal may switch from the message sending/receiving interface to the content sharing interface in response to a trigger operation for the access entry. Alternatively, the content sharing interface may be in other forms, for example, a window interface in the message sending/receiving interface. An area of the window interface is usually relatively small and only occupies a part of the message sending/receiving interface, so that when the local end user views the content sharing interface, the local end user can also view the message sending/receiving interface.

In an embodiment, the message sending/receiving interface and the content sharing interface belong to a same application, for example, both belong to the foregoing communication application. When the terminal starts, according to a trigger operation for an access entry included in the message sending/receiving interface, a content sharing interface related to the organization, there may be a plurality of displaying manners. For example, in a case that the message sending/receiving interface and the content sharing interface are completely independent of each other, it is equivalent that the terminal jumps from the message sending/receiving interface to the content sharing interface, that is, a screen of the terminal only displays the message sending/receiving interface or the content sharing interface at the same time point. In another example, the terminal may display the content sharing interface above the message sending/receiving interface in a floating manner. In another example, the terminal may display the message sending/receiving interface and the content sharing interface side by side.

In an embodiment, the terminal may display prompt information in a display region of the access entry, where the prompt information is used for indicating that there is unread shared content and/or unread interactive content in the content sharing interface. The unread shared content is shared content in an unread state in the content sharing interface. The unread interactive content is interactive content in an unread state in the content sharing interface. The interactive content is sent to the local end user by another user, to realize interaction between the another user and the local end user. For example, the interactive content may include comment content, comment reply content, direct message content, liking content, and the like. The prompt information may be in a plurality of forms, to meet prompt effects under different requirements. For example, the prompt information may include a prompt identifier (for example, a red dot), and the local end user may determine, according to the prompt identifier, whether the unread shared content and/or the unread interactive content exists or not (where presence of the prompt identifier indicates that the unread shared content and/or the unread interactive content exists, and absence of the prompt identifier indicates that no unread shared content and/or unread interactive content exists). In another example, the prompt information may include a prompt value, where the prompt value is an amount of the unread shared content and/or the unread interactive content. The local end user may determine, according to the prompt value, whether the unread shared content and/or the unread interactive content exists or not and an amount thereof (where presence of the prompt value indicates that the unread shared content and/or the unread interactive content exists and the prompt value is a content amount, and absence of the prompt value indicates that no unread shared content and/or unread interactive content exists).

In an embodiment, compared with releasing content to be shared in an associated group corresponding to the organization in related technologies, by displaying the content to be shared in the content sharing interface related to the organization, all shared content can be uniformly displayed in the content sharing interface, and an impact of content of small chats between group members on the displayed content can be avoided, to ensure that the members of the organization can view the shared content more conveniently, thereby helping improve content delivery efficiency.

In an embodiment, the content sharing interface related to the organization means that there is a preset association between the content sharing interface and the organization. For example, the organization has only one related content sharing interface, and the content sharing interface corresponds to the entire organization, so that when any member releases content to be shared to the organization (assuming that the any member has a sharing permission), the content to be shared is presented on the content sharing interface. In another example, the organization may include at least one sub-level organization. A relationship between the organization and the at least one sub-level organization is similar to a relationship between an enterprise and departments, a hospital and departments, a school and classes, or the like. The content sharing interface related to the organization may include: a content sharing general-interface corresponding to the organization, at least one content sharing sub-interface corresponding to the at least one sub-level organization. That is, the content sharing general-interface corresponds to the entire organization, and a content sharing sub-interface corresponds to a sub-level organization (that is, a part of the entire organization). The organization may include a plurality of sub-level organizations. The sub-level organizations may be independent of each other, or there may be at least a part of overlap, and some sub-level organizations at relatively high levels may even completely include one or more other lower-level sub-level organizations. For example, in an enterprise scenario, a development department corresponds to a sub-level organization 1, a subordinate software development department of the development department corresponds to a sub-level organization 2, and a subordinate hardware development department of the development department corresponds to a sub-level organization 3, then the sub-level organization 1 may be considered to include the sub-level organization 2 and the sub-level organization 3, and the sub-level organization 2 and the sub-level organization 3 are independent of each other.

In an embodiment, in a case that both the content sharing general-interface and the at least one content sharing sub-interface exist, for the content sharing request initiated by the sharing party user, the content to be shared may be released to the organization or a sub-level organization of the organization, so as to be presented on the content sharing general-interface or a content sharing sub-interface. For example, the server may determine, according to a permission level of the sharing party user, whether to release the content to be shared to the organization or a sub-level organization of the organization. In a case that the permission level of the sharing party user matches a permission level requirement corresponding to the organization (in this case, the permission level of the sharing party user usually also matches a permission level requirement corresponding a sub-level organization), the server may release the content to be shared to the organization by default, to present the content to be shared on the content sharing general-interface. In a case that the permission level of the sharing party user matches a permission level requirement corresponding to a sub-level organization (the sharing party user may be located in the sub-level organization or not) but does not match the permission level requirement corresponding to the organization, the server may release the content to be shared to the sub-level organization of the organization by default, to present the content to be shared on a corresponding content sharing sub-interface. In another example, the server may determine, according to configuration information of the sharing party user, whether to release the content to be shared to the organization or a sub-level organization where the sharing party user is located, to present the content to be shared on the content sharing general-interface or a content sharing sub-interface corresponding to the sub-level organization where the sharing party user is located. In other words, a permission level of the sharing party user may match a permission level requirement corresponding to the organization, but the sharing party user may still release, by setting the configuration information, the content to be shared to the sub-level organization where the sharing party user is located, to present the content to be shared on the corresponding content sharing sub-interface, instead of releasing the content to be shared to the organization to present the content to be shared on the corresponding content sharing general-interface.

In an embodiment, the content sharing general-interface and the at least one content sharing sub-interface have corresponding access permissions, so as to be only accessible to users having the corresponding access permissions. For example, whether a user can access a corresponding content sharing interface may be determined according to a belonging situation of the user for the organization or a sub-level organization. An access permission of the content sharing general-interface may be limited to all the members of the organization. That is, because the members belong to the organization, the members have access permissions for the content sharing general-interface corresponding to the organization, and users not belonging to the organization cannot access the content sharing general-interface. An access permission of a content sharing sub-interface may be limited to members of a corresponding sub-level organization. That is, because the members belong to the sub-level organization, the members have access permissions for the content sharing sub-interface corresponding to the sub-level organization, and users not belonging to the sub-level organization cannot access the content sharing sub-interface even if the users belong to the organization. Whether a user have a permission to access a corresponding content sharing interface may alternatively be determined in other manners. For example, for the content sharing sub-interface corresponding to the foregoing sub-level organization, all the members of the organization may be set to have access permissions, which is not limited in this specification.

In an embodiment, in a case that content is shared to the organization, in addition to presenting the content on the content sharing interface related to the organization, the terminal may further receive the content sent by the server to the message sending/receiving interface, so that the local end user may choose to view the content to be shared on the content sharing interface or the message sending/receiving interface. For example, the local end user is already located on the message sending/receiving interface, then the local end user can quickly view the content to be shared on the message sending/receiving interface without having to switch to the content sharing interface and search in the content sharing interface for the content to be shared. For example, the terminal may further receive an access link of the content within the content sharing interface sent by the server to the message sending/receiving interface, so that although the local end user cannot directly view the content to be shared in the message sending/receiving interface, the local end user can quickly jump to and view the content to be shared by simply triggering the access link in the message sending/receiving interface without having to search in the content sharing interface for the content to be shared.

A content sharing solution of this application is exemplarily described below by using an application T as an example.

By running a program on a server side of the application T on a server and running a program on a terminal side of the application T on a terminal, the server may be configured as a server end of the application T, and the terminal may be configured as a client of the application T. In this way, the server end and the client cooperate to realize the content sharing solution of this specification.

Figure 6:
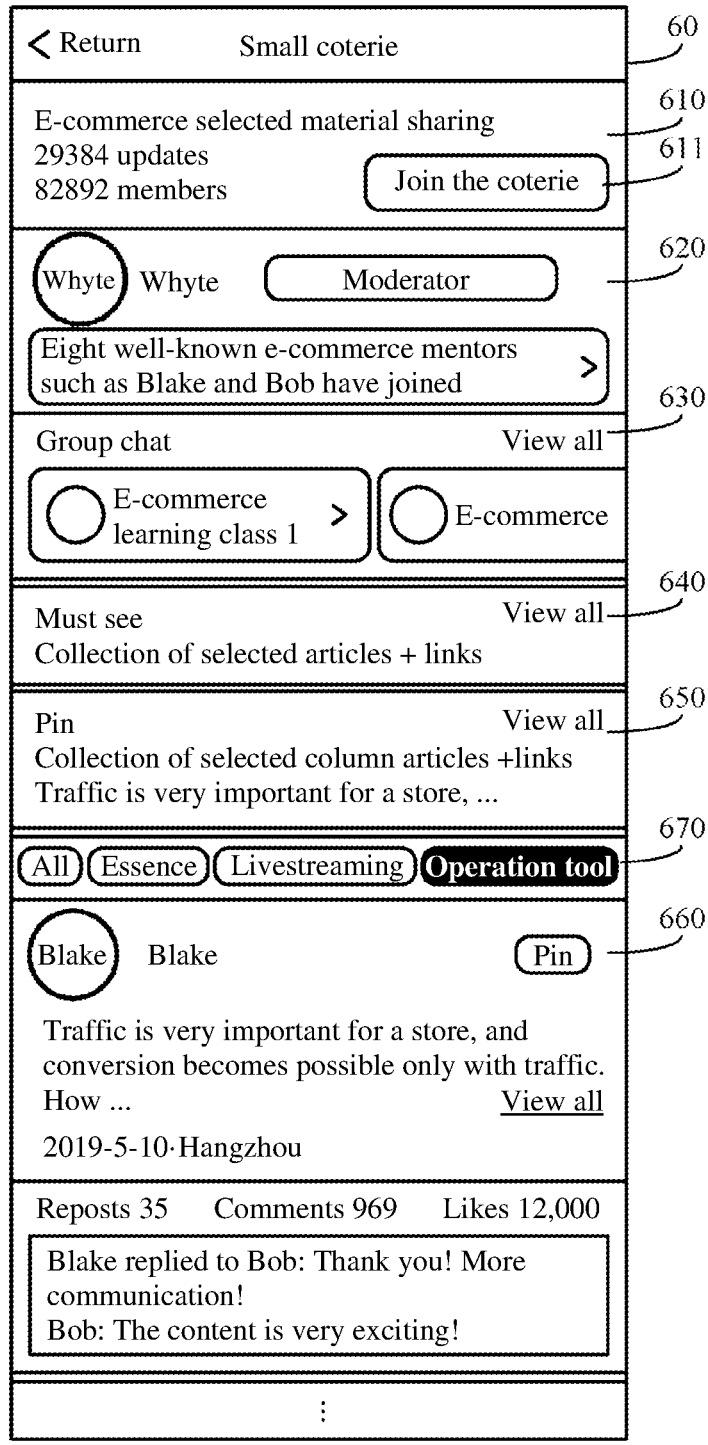
FIG. 6 is a schematic diagram of a content sharing interface, according to an exemplary embodiment.

According to the content sharing solution of this specification, the application T can provide a content sharing function. For example, the content sharing function may be referred to as "small coterie." FIG. 6 is a schematic diagram of a content sharing interface, according to an exemplary embodiment. As shown in FIG. 6, the small coterie function provided by the application T may include a content sharing interface 60, so that shared content can be presented on the content sharing interface 60.

The content sharing interface 60 may include a summary information display region 610 for displaying summary information related to the content sharing interface 60. For example, the summary information may include: a name of an organization corresponding to the content sharing interface 60 is "E-commerce selected material sharing," an amount of shared content (updates) in the content sharing interface 60 is 29384, and a quantity of members included in the organization "E-commerce selected material sharing" is 82892.

The content sharing interface 60 may include a key member introduction region 620 for displaying information of key members in the organization. For example, the key members may include a moderator, which is equivalent to an administrator of the organization. In another example, the key members may include well-known users. For example, well-known users in the organization "E-commerce selected material sharing" may include a "well-known e-commerce mentor." Displaying the information of the key members can help users that do not join the organization to quickly learn about related situations of the organization through the information of the key members, thereby guiding or attracting these users to join the organization.

The content sharing interface 60 may include a group chat entry display region 630, to display corresponding access entries for message sending/receiving interfaces (that is, group chat interfaces) of associated groups of the organization. For example, the associated groups of the organization "E-commerce selected material sharing" may include an "E-commerce learning class 1," "E-commerce learning class 2," and the like. Because an area of the group chat entry display region 630 is limited, usually only access entries corresponding to some associated groups can be displayed, and related information and access entries of the other associated groups may be viewed by triggering a "view all" option in the group chat entry display region 630.

The content sharing interface 60 may include a must-see information display region 640 for displaying the most important shared information, that is, must-see information. For example, the must-see information display region 640 may include "Collection of selected articles+links," and the like. Similarly, because an area of the must-see information display region 640 is limited, usually only some must-see information can be displayed, and the other must-see information may be viewed by triggering a "view all" option in the must-see information display region 640.

The content sharing interface 60 may include a pinned information display region 650 for displaying relatively important shared information (but is less important than the must-see information), that is, pinned information. For example, the pinned information display region 650 may include "Collection of selected column articles+links," "traffic is very important for a store, . . . ," and the like. Similarly, because an area of the pinned information display region 650 is limited, usually only some pinned information can be displayed, and the other pinned information may be viewed by triggering a "view all" option in the pinned information display region 650.

The remaining region in the content sharing interface 60 may be configured for displaying existing shared content in the organization "E-commerce selected material sharing," for example, displaying the shared content in reverse order in a form of a list, for users to view recently released shared content first. For example, as shown in FIG. 6, the content sharing interface 60 includes shared content 660. The shared content 660 may include content such as information of a content sharing party (for example, an avatar and a name), content shared by the content sharing party, and interactive information for the content (such as a quantity of reposts, a quantity of comments, a quantity of likes, comment information, and comment reply information). If the shared content 660 is set (content released by the moderator is defaulted by the system as must-see content or pinned content by a system, or actively set by the moderator or another user having an administrative permission) as must-see content or pinned content, a corresponding mark may be added as representation. For example, a "pinned" tab is shown for the shared content 660 in FIG. 6. If there are a plurality of pieces of comment information, comment reply information, and the like, such information may be arranged according to releasing time points, for example, arranged in descending order according to the releasing time points, for the user to view recently released information first.

The content sharing interface 60 may include a type selection region 670, for the user to quickly screen the shown shared content. For example, the type selection region 670 in FIG. 6 shows type options such as "all," "essence," "livestreaming," and "operation tool," so that the user may select one or more type options, for the content sharing interface 60 to show only these types of shared content, thereby facilitating the user in viewing. Correspondingly, for the shared content released within the organization "E-commerce selected material sharing," a corresponding type tab should be added, thereby implementing screening and displaying based on matching between type tabs and type options.

As described above, the organization "E-commerce selected material sharing" may have one or more associated groups, for example, an "E-commerce learning class 1" and an "E-commerce learning class 2" in the group chat entry display region 630. When it is detected that the user triggers a group chat entry, a corresponding group chat interface may be quickly switched to. The user should be a member of a corresponding associated group, and then the switching can be ensured to successfully implemented; otherwise, a processing procedure of adding the user as a group member may be triggered first.

Figure 7:
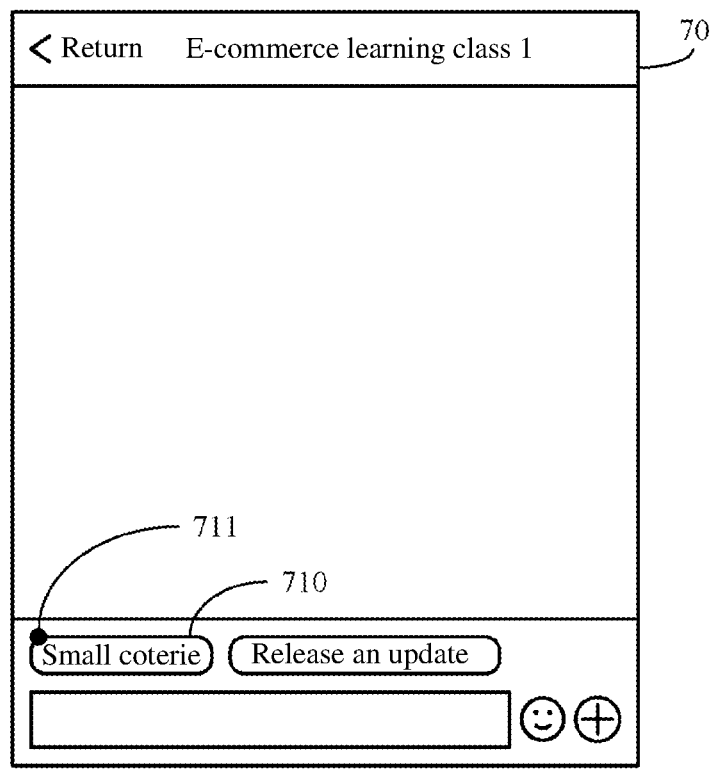
FIG. 7 is a schematic diagram of a group chat interface, according to an exemplary embodiment.

Similarly, the user may quickly access the content sharing interface 60 from a group chat interface of an associated group. For example, FIG. 7 is a schematic diagram of a group chat interface, according to an exemplary embodiment. As shown in FIG. 7, a group chat interface 70 corresponding to an associated group "e-commerce training class 1" may include an access entry 710 for the content sharing interface 60. Therefore, when a user receives/sends a group chat message in the group chat interface 70, the user may quickly jump from the group chat interface 70 to the content sharing interface 60 by triggering the access entry 710.

In a case that there is unread shared content or unread interactive content (or both unread shared content and unread interactive content exist) in the content sharing interface 60, a prompt identifier 711 may be shown at an upper left corner of the access entry 710 (which may alternatively be another position or region related to the access entry 710). For example, the prompt identifier 711 may be a dot. Therefore, even if the user is in the group chat interface 70, the user can still quickly determine, based on the prompt identifier 711, that there is unread shared content and/or unread interactive content in the content sharing interface 60.

Figure 8:
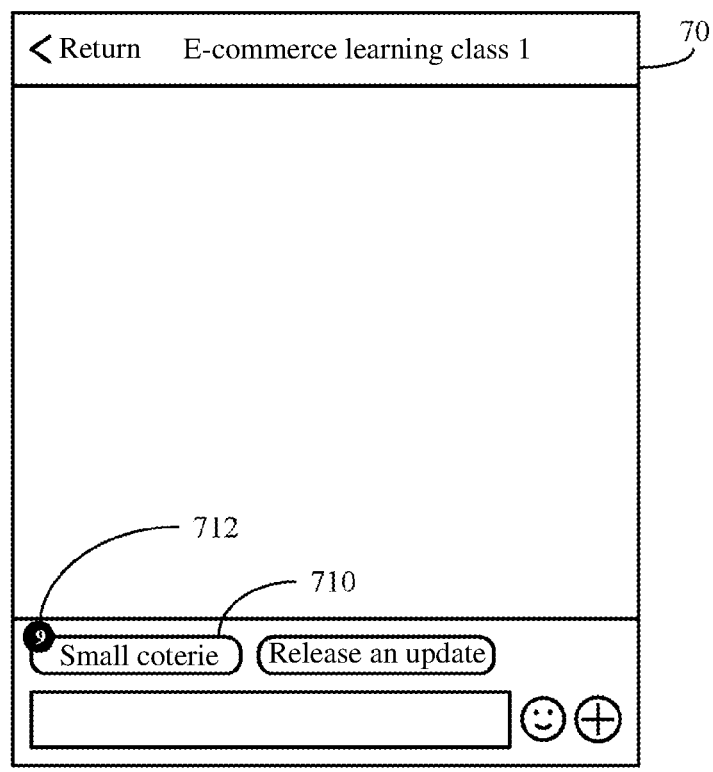
FIG. 8 is another schematic diagram of a group chat interface, according to an exemplary embodiment.

The prompt identifier 711 may alternatively be transformed into other forms. For example, FIG. 8 is another schematic diagram of a group chat interface, according to an exemplary embodiment. As shown in FIG. 8, in a case that there is unread shared content or unread interactive content (or both unread shared content and unread interactive content exist) in the content sharing interface 60, a digital identifier 712 may be shown at an upper left corner of the access entry 710 (which may alternatively be another position or region related to the access entry 710), so that even if the user is in the group chat interface 70, the user can still quickly determine, based on the digital identifier 712, that there is unread shared content and/or unread interactive content in the content sharing interface 60. When the digital identifier 712 include a number 9, it indicates that there are 9 pieces of unread shared content or unread interactive content in the content sharing interface 60.

In some embodiments, a terminal may display a messaging interface of a chat group, the messaging including an access entry; according to a trigger operation on the access entry, display a content sharing interface corresponding to the chat group, where the content sharing interface is configured to display shared contents of members of the chat group; determine content to be shared in the chat group; initiate a content sharing request to a server, for the server to release the content to the chat group; and in response to receiving a release of the content from the server, display the content (i) on the content sharing interface and (ii) in a floating window on the messaging interface, where the floating window is isolated from group chats in the messaging interface of the chat group.

Figure 9:
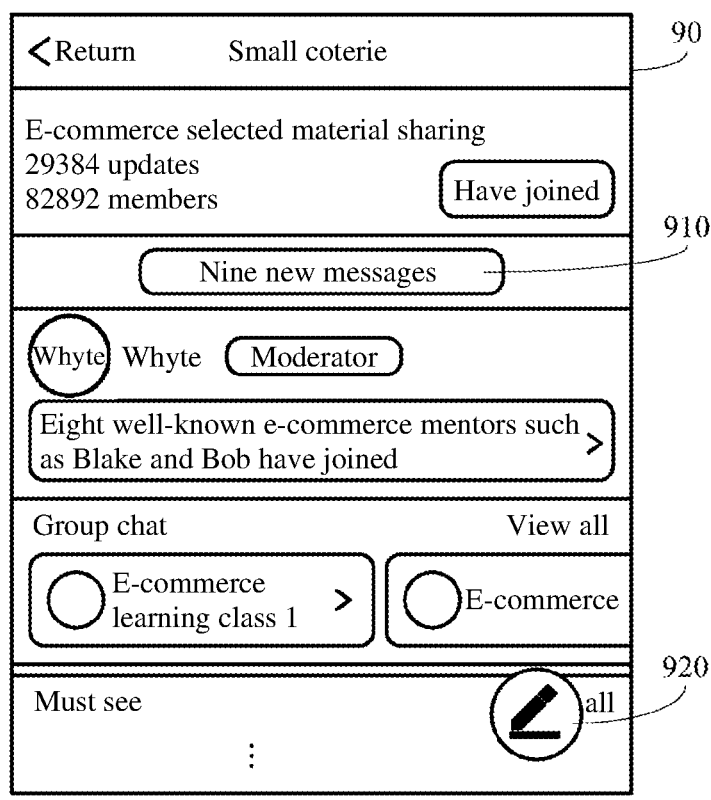
FIG. 9 is another schematic diagram of a content sharing interface, according to an exemplary embodiment.

FIG. 9 is another schematic diagram of a content sharing interface, according to an exemplary embodiment. Based on a trigger operation of a user on the digital identifier 712, the user may switch from the group chat interface 70 shown in FIG. 8 to a content sharing interface 90 shown in FIG. 9. Content included in the content sharing interface 90 is similar to that of the foregoing content sharing interface 60. Corresponding to the digital identifier 712, the content sharing interface 90 may include a content viewing entry 910 shown in FIG. 9, so that the user may view 9 pieces of corresponding new content, that is, the foregoing unread shared content or unread interactive content by triggering the content viewing entry 910.

Although the content included in the content sharing interface 60 and quick switching between the content sharing interface 60 and the group chat interface 70 are described in the foregoing embodiments, the user may need to join the organization "E-commerce selected material sharing" in advance. For example, the user may need to join the organization "E-commerce selected material sharing," and then can view all the content shown in FIG. 6 in the content sharing interface 60; otherwise, the user can only view part of the content, for example, only the summary information display region 610, the key member introduction region 620, and the group chat entry display region 630, and cannot view other content. Alternatively, although the user can view all the content in the content sharing interface 60, the user cannot release content (that is, cannot share content). Correspondingly, after the user join the organization "E-commerce selected material sharing," the content sharing interface 90 may include a content releasing option 920 shown in FIG. 9, so that the user may trigger the content releasing option 920 to release content, thereby implementing content sharing. The content releasing option 920 may be floated in the content sharing interface 90, and in a process in which the user scrolls through the content sharing interface 90, a position of the content releasing option 920 on a device screen is unchanged, so that the user may conveniently perform a trigger operation for the content releasing option 920 at any time.

Figure 10:
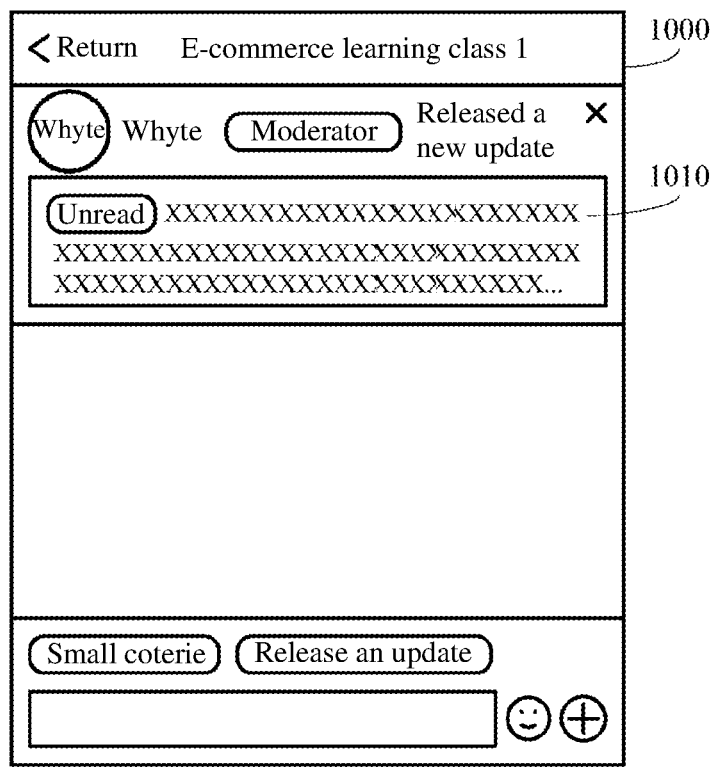
FIG. 10 is a schematic diagram of pushing shared content on a group chat interface, according to an exemplary embodiment.

After one piece of shared content is released to the organization "E-commerce selected material sharing" by the user, in addition to being displayed on the content sharing interface 90 (or the content sharing interface 60), the shared content may further be pushed to a corresponding associated group. For example, FIG. 10 is a schematic diagram of pushing shared content on a group chat interface, according to an exemplary embodiment. The organization "E-commerce selected material sharing" has one associated group "E-commerce learning class 1." If a user "Whyte" releases an update in the organization "E-commerce selected material sharing," that is, releases a piece of shared content, the shared content may be automatically pushed to a group chat interface 1000 shown in FIG. 10, for group members to view corresponding content 1010 in the group chat interface 1000. In the embodiment shown in FIG. 10, the content 1010 is displayed in a floating window on the top of the group chat interface 1000, so that the content 1010 may be floated and displayed on an upper layer of group chat messages in the group chat interface 1000, to prevent the group chat messages from blocking or inundating the content 1010.

If an information amount of the content 1010 is relatively large, the content probably cannot be completely displayed in the floating window shown in FIG. 10, so that part of the content may be only displayed in the floating window from front to back, and the user may trigger the content 1010 and jump to a display page of the content 1010 in the content sharing interface 90, for the user to completely view the content 1010 without having to actively search in the content sharing interface 90 for the content 1010 by the user. The floating window may further show a reading state of the user for related shared content, for example, "read" or "unread."

Figure 11:
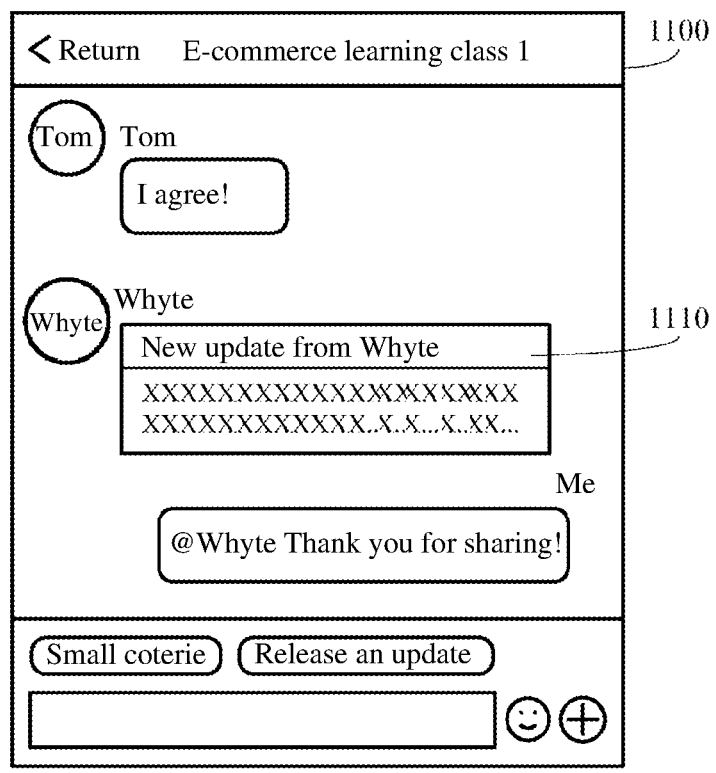
FIG. 11 is another schematic diagram of pushing shared content on a group chat interface, according to an exemplary embodiment.

FIG. 11 is another schematic diagram of pushing shared content on a group chat interface, according to an exemplary embodiment. If a user "Whyte" releases an update in the organization "E-commerce selected material sharing," that is, releases a piece of shared content, the shared content may be automatically pushed to a group chat interface 1100 shown in FIG. 11, and the shared content will be displayed on the group chat interface 1100 in a form of a communication message 1110, for other group members to view. Similar to the embodiment shown in FIG. 10, if an information amount of the shared content is relatively large, the shared content probably cannot be completely displayed in a display region of a communication message 1110, so that part of the content may be only displayed in the display region from front to back, and the user may trigger the communication message 1110 and jump to a display page of the shared content in the content sharing interface 90, for the user to completely view the shared content without having to actively search in the content sharing interface 90 for the shared content by the user.

Figure 12:
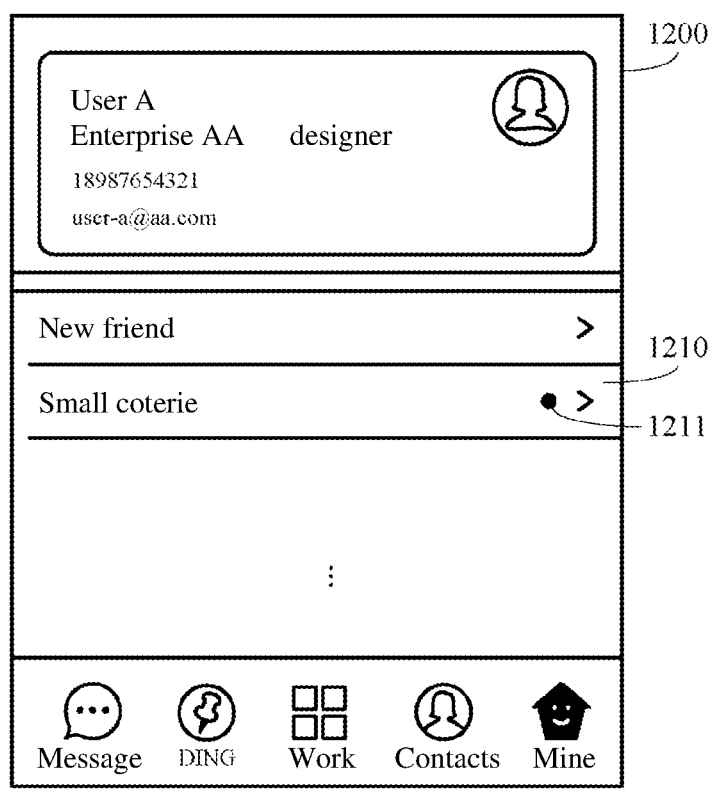
FIG. 12 and FIG. 13 are schematic diagrams of accessing a content sharing interface, according to an exemplary embodiment.
Figure 13:
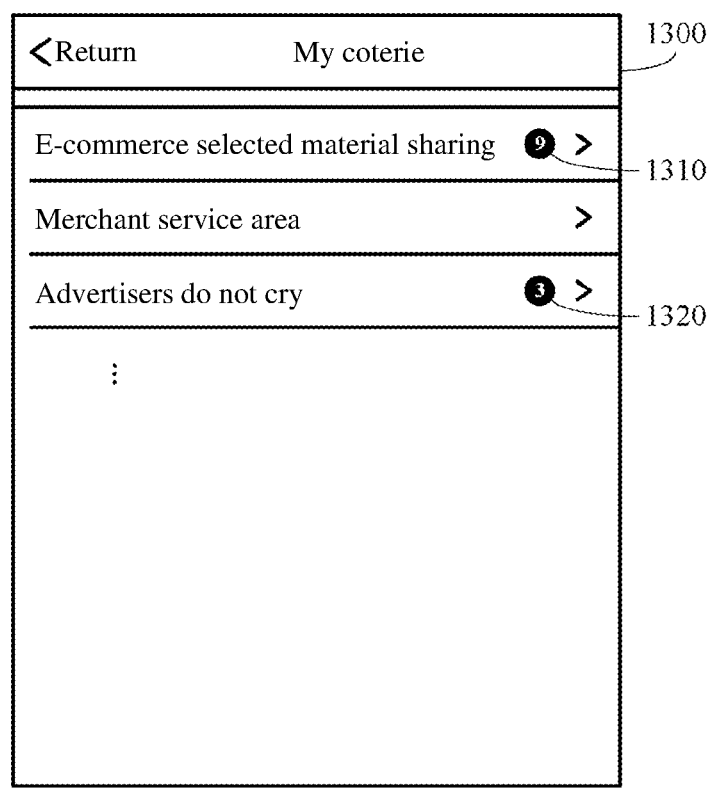

FIG. 12 and FIG. 13 are schematic diagrams of accessing a content sharing interface, according to an exemplary embodiment. As shown in FIG. 12, an application T may provide an access entry 1210 independent of an associated group to a user, for the user to access, based on the access entry 1210, a content sharing interface of an organization that the user joined, for example, access the foregoing content sharing interface 90 based on the access entry 1210. The application T may include a tab bar as shown at the bottom of FIG. 12, and the user can trigger tabs such as "Message," "DING," "Work," "Contacts," and "Mine" included in the tab bar to switch between corresponding tab pages. For example, in a case that the tab page "Mine" is triggered, a function interface 1200 shown in FIG. 12 may be shown.

Assuming that the user only joined the organization "E-commerce selected material sharing," the user may trigger an access entry 1200 shown in FIG. 12 to directly jump to the content sharing interface 90 shown in FIG. 9. If the user simultaneously joined a plurality of organizations, the user may trigger an access entry 1210 shown in FIG. 12 to jump to an organization management interface 1300 shown in FIG. 13. The organization management interface 1300 includes access entries corresponding to all the organizations that the user has joined, so that the user may select and trigger an access entry to directly jump to a corresponding content sharing interface.

Similar to the embodiments shown in FIG. 7 and FIG. 8, a prompt identifier 1211 may be shown at the access entry 1210, to indicate that there is unread shared content and/or unread interactive content in an organization that the user joined. After the user further enters the organization management interface 1300 shown in FIG. 13, a digital identifier may be shown on an access entry corresponding to an organization. For example, a digital identifier 1310 corresponding to an organization "E-commerce selected material sharing" indicates that there are nine pieces of unread shared content and/or unread interactive content. In another example, a digital identifier 1320 corresponding to an organization "Advertisers do not cry" indicates that there are three pieces of unread shared content and/or unread interactive content.

The user may join the foregoing organizations in a plurality of manners. For example, in the embodiment shown in FIG. 6, the summary information display region 610 may include an application option 611, and the user may trigger the application option 611 to request to join the organization "E-commerce selected material sharing." According to a predefined permission rule, the user may directly join the organization "E-commerce selected material sharing" without review, or the user needs to approved by a member having an administrative permission such as a moderator and then join the organization "E-commerce selected material sharing" and the like.

The user may first need to join an associated group, and then can trigger the application option 611; otherwise, the user cannot trigger the application option 611, and probably even cannot view the content sharing interface 60. Therefore, a process in which the user joins the associated group may be managed. For example, when the associated group is an internal group of an enterprise, the user is necessarily located or added to an organization structure of the enterprise; otherwise, the user cannot join the associated group, to ensure that members of the associated group are closely related, and prevent irrelevant persons from randomly joining the associated group and the corresponding organization.

Figure 14:
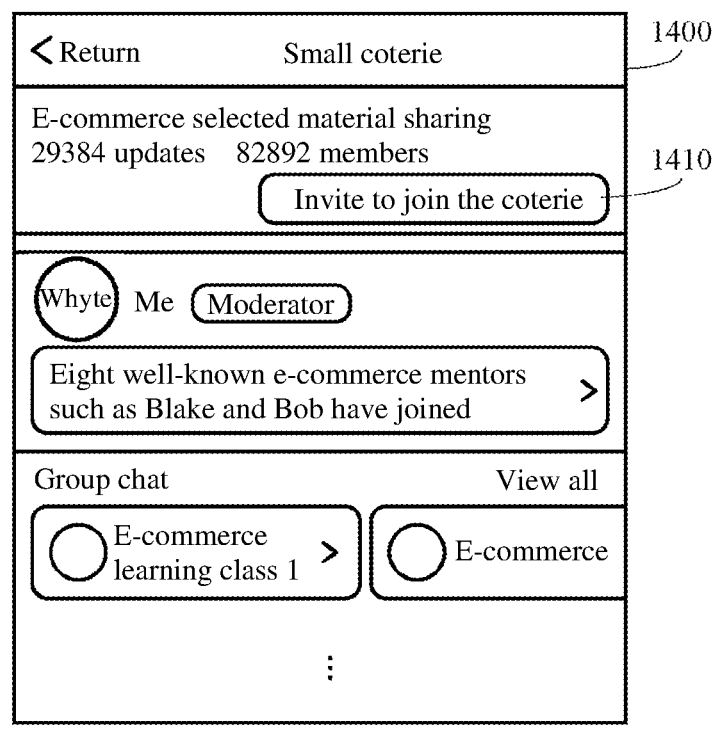
FIG. 14 and FIG. 15 are schematic diagrams of inviting a user to join an organization, according to an exemplary embodiment.
Figure 15:
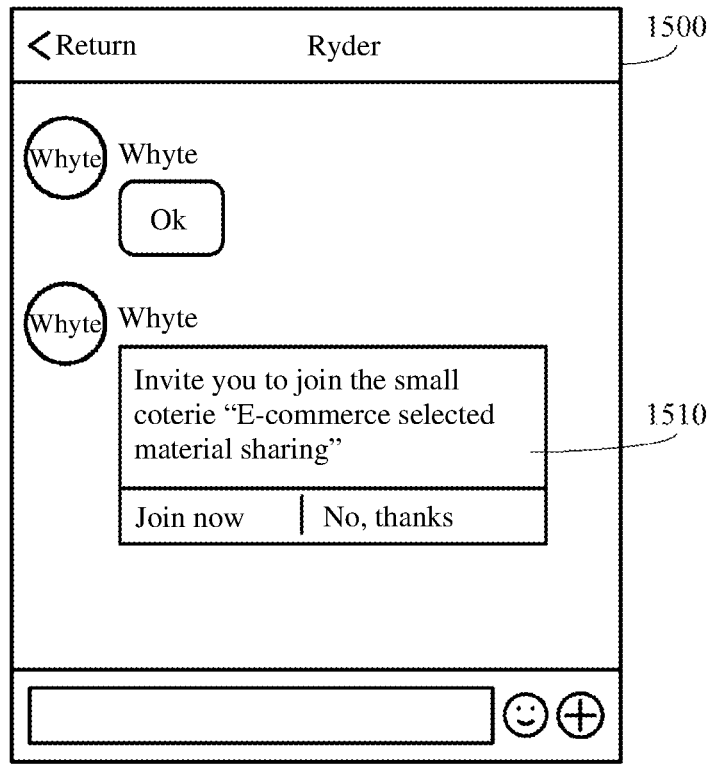

Members of the organization may be expanded through invite-only. For example, FIG. 14 and FIG. 15 are schematic diagrams of inviting a user to join in an organization, according to an exemplary embodiment. As shown in FIG. 14, a moderator of an organization "E-commerce selected material sharing" is a user "Whyte," and a browsed content sharing interface 1400 presented by the application T to the user "Whyte" may include an invitation option 1410. By triggering the invitation option 1410, the user "Whyte" may select one or more associated users of the user "Whyte," and invite the associated users to join the organization "E-commerce selected material sharing." The associated users herein may include a friend of the user "Whyte" in the application T, a local contact on a terminal, a member of a group to which user "Whyte" belongs, and a member of an enterprise to which user "Whyte" belongs, which is not limited in this specification.

Assuming that a user "Ryder" is selected by the user "Whyte," the user "Ryder" may receive, by using a single chat interface 1500 shown in FIG. 15, an invitation message 1510 sent by the user "Whyte," so that the user "Ryder" may select "Join now" or "No, thanks" included in the invitation message 1510, to accept or refuse the invitation. Alternatively, the invitation message 1510 may include no option, but may be linked to the content sharing interface 60 shown in FIG. 6, so that the user "Ryder" may join the organization "E-commerce selected material sharing" based on the application option 611 in a process of browsing the content sharing interface 60.

Based on the above, this specification provides an efficient and convenient content sharing solution, thereby implementing content sharing between members joining the same organization. Compared with a community, a post bar, and the like in related technologies, organization members in this specification are more closely related. For example, application of the organization "E-commerce selected material sharing" in the foregoing embodiment to an e-commerce scenario helps an operator of an electronic business platform provide a content sharing function to a large quantity of and various types of merchants. For example, different types of merchants may be respectively located in different groups, so that the operator only needs to associate all these groups to the organization "E-commerce selected material sharing," and then the operator can release shared content for the organization "E-commerce selected material sharing." The merchants in the groups can all view the shared content through a content sharing interface, and the operator does not need to join all the groups and send the shared content in each of the groups.

In addition to the e-commerce scenario, the content sharing solution of this specification may alternatively be applied to a plurality of other scenarios, such as internal empowerment of an enterprise group, educational training, an enterprise service, an official account and brand operation, a social organization (such as a chamber of commerce or a conference), a government institution, public security, a troop, a chain enterprise, alliance business, channel business, a hospital, a fan group, an interest group, which is not limited in this specification.

In addition to the foregoing moderator, there may further be other members having administrative permissions in the organization. For example, the moderator may give administrative permissions to one or more members in the organization. If all members having administrative permissions are referred to as administrators, different administrators may have differentiated administrative permissions. For example, only administrators in the organization can release shared content in a content sharing interface, and different administrators can only release shared content of corresponding types of administrative permissions of the administrators due to differences between the administrative permissions.

Figure 16:
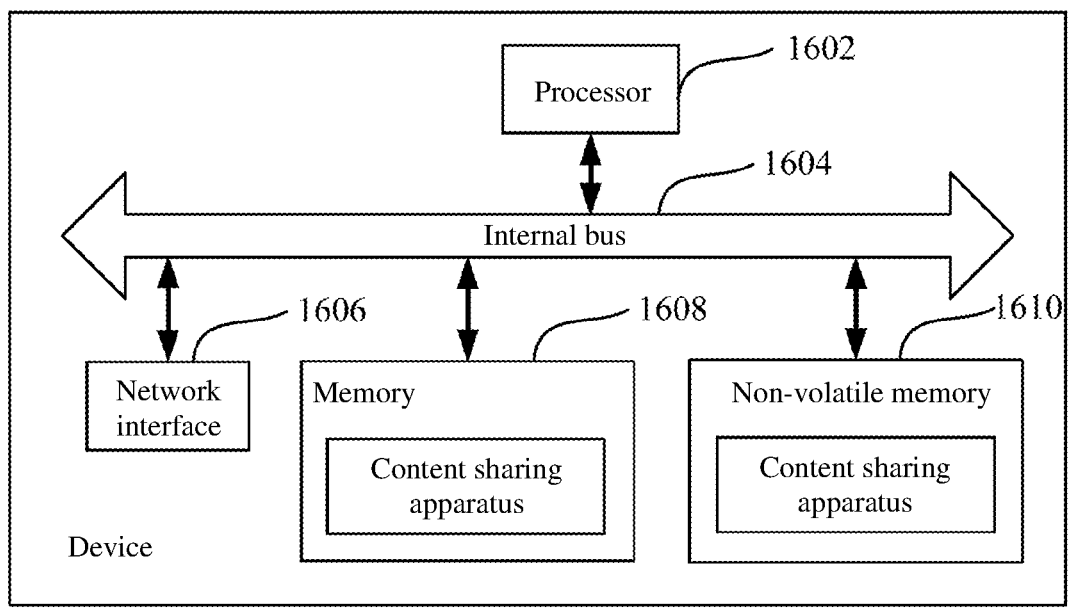
FIG. 16 is a schematic structural diagram of a device on a server side, according to an exemplary embodiment.

FIG. 16 is a schematic structural diagram of a device, according to an exemplary embodiment. Referring to FIG. 16, at a hardware level, the device includes a processor 1602, an internal bus 1604, a network interface 1606, a memory 1608, and a non-volatile memory 1610, and may further include hardware required for other services. The processor 1602 reads a corresponding computer program from the non-volatile memory 1610 into the memory 1608 and then executes the computer program, to form a content sharing apparatus at a logic level. In addition to a software implementation, one or more embodiments of this specification do not exclude other implementations, for example, logic devices or a software-hardware combination. That is, execution entities of the following processing procedures are not limited to logic units and may alternatively be hardware or logic devices.

Figure 17:
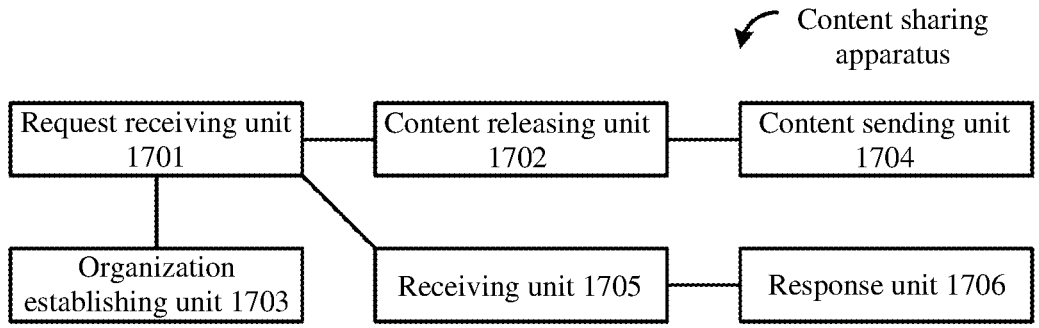
FIG. 17 is a block diagram of a content sharing apparatus on a server side, according to an exemplary embodiment.

Referring to FIG. 17, in a software implementation, the content sharing apparatus may include: a request receiving unit 1701, configured to enable a server to receive a content sharing request initiated by a sharing party user, where the content sharing request is used for sharing content to be shared, submitted by the sharing party user, in an organization where the sharing party user is located; and a content releasing unit 1702, configured to enable the server to release the content to be shared to the organization, so that the content to be shared is presented on a content sharing interface related to the organization.

Optionally, the sharing party user is any member of the organization; or the sharing party user is a member in the organization that has a sharing permission.

Optionally, members in the organization meet a predefined user relationship.

Optionally, the predefined user relationship includes: belonging to a same institution and/or participating in a same event.

Optionally, the organization has a corresponding associated group; and the apparatus further includes: an organization establishing unit 1703, configured to enable the server to establish the organization for the associated group, for group members to have a one-to-one correspondence with members of the organization.

Optionally, a message sending/receiving interface of the associated group includes an access entry for the content sharing interface.

Optionally, the apparatus further includes:
a content sending unit 1704, configured to enable the server to send the content to be shared and/or an access link of the content to be shared in the content sharing interface to the associated group of the organization.

Optionally, the apparatus further includes:
a receiving unit 1705, configured to enable the server to receive a join request of an applicant user for the organization; and a response unit 1706, configured to enable the server to add the applicant user to the organization when determining that the applicant user initiates the join request based on a join invitation sent by a member of the organization; otherwise, refusing to add.

Optionally, the organization includes at least one sub-level organization; and the content sharing interface includes: a content sharing general-interface corresponding to the organization and at least one content sharing sub-interface corresponding to the at least one sub-level organization.

The content releasing unit 1702 is configured to: enable the server to release, according to a permission level of the sharing party user, the content to be shared to the organization or a sub-level organization of the organization, so that the content to be shared is presented on the content sharing general-interface or a content sharing sub-interface; or enable the server to release, according to configuration information of the sharing party user, the content to be shared to the organization or a sub-level organization where the sharing party user is located, so that the content to be shared is presented on the content sharing general-interface or a content sharing sub-interface corresponding to the sub-level organization where the sharing party user is located.

Optionally, an access permission of the content sharing general-interface is limited to all members of the organization; and an access permission of a content sharing sub-interface is limited to all the members of the organization or members of a corresponding sub-level organization.

Optionally, the server runs a server-end program of an instant messaging application to implement the content sharing method.

Figure 18:
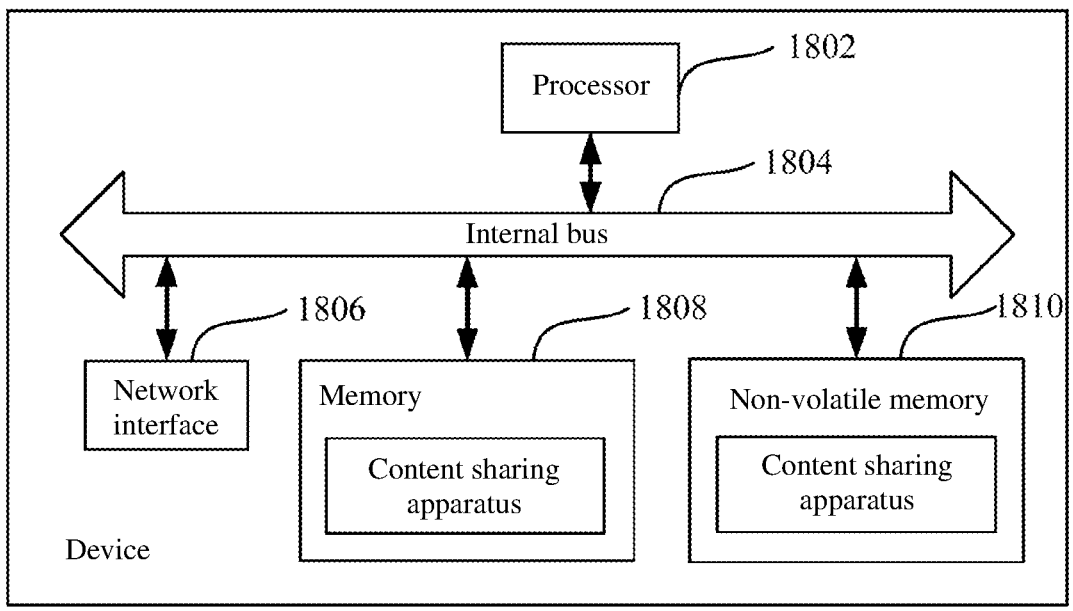
FIG. 18 is another schematic structural diagram of a device on a server side, according to an exemplary embodiment.

FIG. 18 is a schematic structural diagram of a device, according to an exemplary embodiment. Referring to FIG. 18, at a hardware level, the device includes a processor 1802, an internal bus 1804, a network interface 1806, a memory 1808, and a non-volatile memory 1810, and may further include hardware required for other services. The processor 1802 reads a corresponding computer program from the non-volatile memory 1810 into the memory 1808 and then executes the computer program, to form a content sharing apparatus at a logic level. In addition to a software implementation, one or more embodiments of this specification do not exclude other implementations, for example, logic devices or a software-hardware combination. That is, execution entities of the following processing procedures are not limited to logic units and may alternatively be hardware or logic devices.

Figure 19:
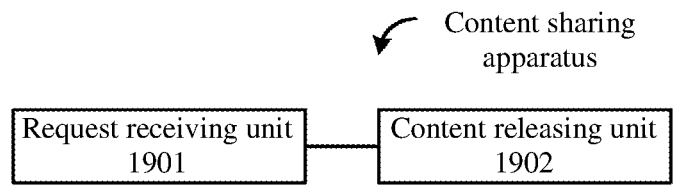
FIG. 19 is another block diagram of a content sharing apparatus on a server side, according to an exemplary embodiment.

Referring to FIG. 19, in a software implementation, the content sharing apparatus may include: a request receiving unit 1901, configured to enable a server to receive a content sharing request initiated by a sharing party user; and a content releasing unit 1902, configured to enable the server to release content to be shared, provided by the sharing party user, to an organization, so that the content to be shared is presented on a content sharing interface related to the organization.

Figure 20:
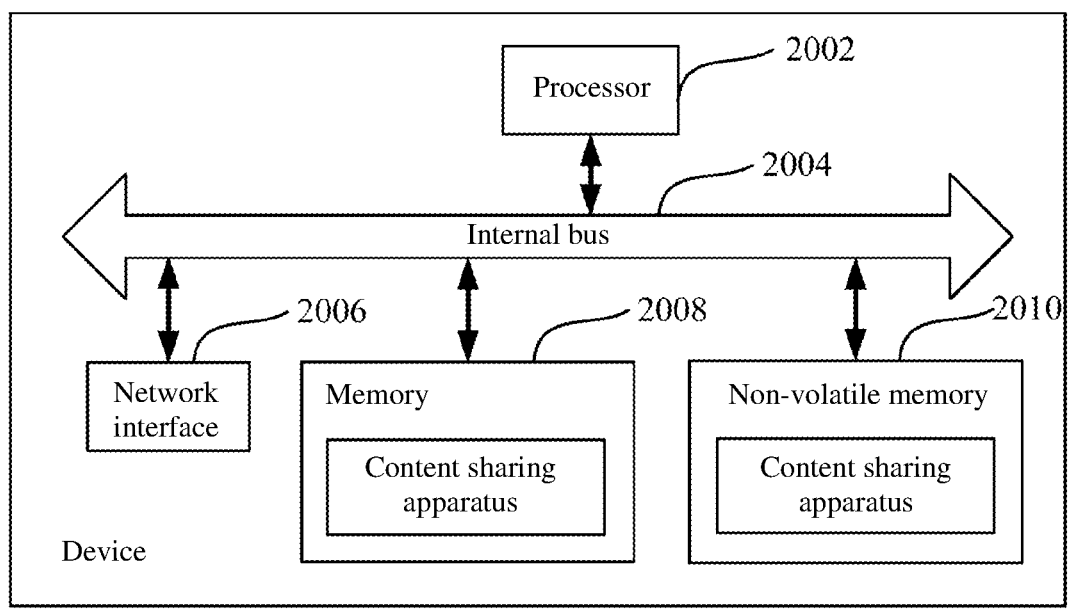
FIG. 20 is a schematic structural diagram of a device on a terminal side, according to an exemplary embodiment.

FIG. 20 is a schematic structural diagram of a device, according to an exemplary embodiment. Referring to FIG. 20, at a hardware level, the device includes a processor 2002, an internal bus 2004, a network interface 2006, a memory 2008, and a non-volatile memory 2010, and may further include hardware required for other services. The processor 2002 reads a corresponding computer program from the non-volatile memory 2010 into the memory 2008 and then executes the computer program, to form a content sharing apparatus at a logic level. In addition to a software implementation, one or more embodiments of this specification do not exclude other implementations, for example, logic devices or a software-hardware combination. That is, execution entities of the following processing procedures are not limited to logic units and may alternatively be hardware or logic devices.

Figure 21:
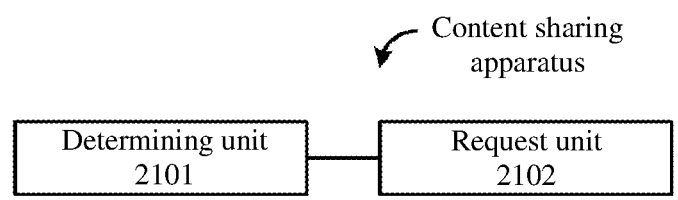
FIG. 21 is a block diagram of a content sharing apparatus on a terminal side, according to an exemplary embodiment.

Referring to FIG. 21, in a software implementation, the content sharing apparatus may include: a determining unit 2101, configured to enable a terminal to determine content to be shared provided by a sharing party user and an organization where the sharing party user is located; and a request unit 2102, configured to enable the terminal to initiate a content sharing request to a server, for the server to release the content to be shared to the organization, so that the content to be shared is presented on a content sharing interface related to the organization.

Figure 22:
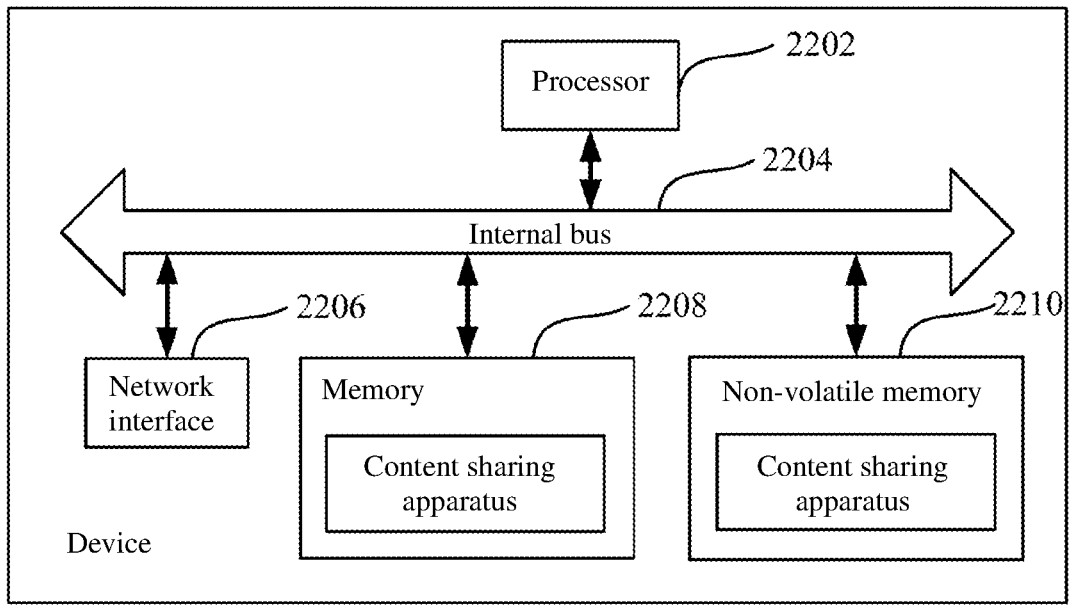
FIG. 22 is another schematic structural diagram of a device on a terminal side, according to an exemplary embodiment.

FIG. 22 is a schematic structural diagram of a device, according to an exemplary embodiment. Referring to FIG. 22, at a hardware level, the device includes a processor 2202, an internal bus 2204, a network interface 2206, a memory 2208, and a non-volatile memory 2210, and may further include hardware required for other services. The processor 2202 reads a corresponding computer program from the non-volatile memory 2210 into the memory 2208 and then executes the computer program, to form a content sharing apparatus at a logic level. In addition to a software implementation, one or more embodiments of this specification do not exclude other implementations, for example, logic devices or a software-hardware combination. That is, execution entities of the following processing procedures are not limited to logic units and may alternatively be hardware or logic devices.

Figure 23:
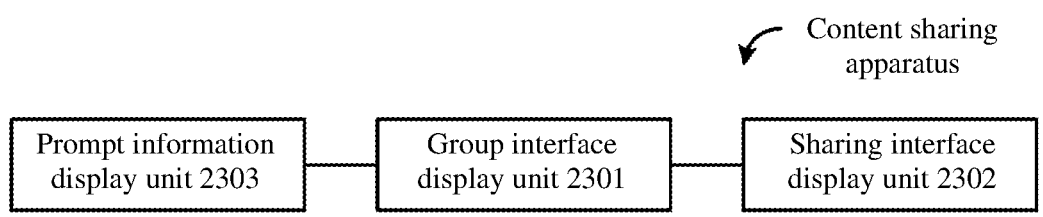
FIG. 23 is another block diagram of a content sharing apparatus on a terminal side, according to an exemplary embodiment.

Referring to FIG. 23, in a software implementation, the content sharing apparatus may include: a group interface display unit 2301, configured to enable a terminal to display a message sending/receiving interface of a group where a local end user is located, where the group corresponds to an organization where the local end user is located; and a sharing interface display unit 2302, configured to enable the terminal to start, according to a trigger operation for an access entry included in the message sending/receiving interface, a content sharing interface related to the organization, where the content sharing interface is configured to display shared content of a member from the organization.

Optionally, the apparatus further includes: a prompt information display unit 2303, configured to enable the terminal to display prompt information in a display region of the access entry, where the prompt information is used for indicating that there is unread shared content and/or unread interactive content in the content sharing interface.

Optionally, the content sharing interface and the message sending/receiving interface belong to a same application.

Optionally, the sharing interface display unit 2302 is configured to: enable the terminal to jump from the message sending/receiving interface to the content sharing interface; or enable the terminal to display the content sharing interface above the message sending/receiving interface in a floating manner; or enable the terminal to display the message sending/receiving interface and the content sharing interface side by side.

The system, the apparatus, the module or the unit described in the foregoing embodiments may be implemented by a computer chip or an entity, or implemented by a product having a certain function. A typical implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (such as CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer include, but are not limited to, a phase-change memory (PRAM), a static random-access memory (SRAM), a dynamic random-access memory (DRAM), a RAM of another type, a ROM, an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which may be configured to store information accessible by a computing device. According to limitations of this specification, the computer-readable medium does not include transitory computer-readable media, such as a modulated data signal and a modulated carrier.

It should be further noted that the terms "include," "comprise," or any variants thereof are intended to cover a non-exclusive inclusion. Therefore, a process, method, article, or device that includes a series of elements not only includes such elements, but also includes other elements not specified expressly, or may include inherent elements of the process, method, article, or device. Without further limitation, the element defined by a phrase "include a/an . . ." does not exclude other same elements in the process, method, article or device which include the element.

Specific embodiments of this specification are described above. Other embodiments fall within the scope of the appended claims. In some cases, the actions or steps recorded in the claims may be performed in sequences different from those in the embodiments and an expected result may still be achieved. In addition, the processes depicted in the accompanying drawings are not necessarily performed in the shown specific order or successively to achieve an expected result. In some implementations, multitasking and parallel processing may be feasible or beneficial.

The terms used in one or more embodiments of this specification are merely used to describe the specific embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like may be used to describe various information in one or more embodiments of this specification, such information should not be limited to these terms. These terms are merely used to distinguish between information of the same type. For example, without departing from the scope of one or more embodiments of this specification, first information may also be referred to as second information. Similarly, second information may also be referred to as first information. According to the context, the word "if" used herein may be interpreted as "during" or "when" or "in response to determining."

The foregoing descriptions are merely exemplary embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A content sharing method, comprising:
   displaying, by a terminal, a messaging interface of a chat group, the messaging interface including an access entry;
   according to a trigger operation on the access entry, displaying, by the terminal, a content sharing interface corresponding to the chat group, wherein the content sharing interface is configured to display shared contents of members of the chat group;
   determining, by the terminal, content to be shared in the chat group;
   initiating, by the terminal, a content sharing request to a server, for the server to release the content to the chat group; and
   in response to receiving a release of the content from the server, displaying, by the terminal, the content on the content sharing interface
   wherein the chat group corresponds to an organization comprising at least one sub-level organization; and the content sharing interface comprises: a content sharing general-interface corresponding to the organization and at least one content sharing sub-interface corresponding to the at least one sub-level organization.

2. The method of claim 1, further comprising:
   receiving, by the server, the content sharing request; and
   releasing, by the server, the content to be shared to the chat group.

3. The method according to claim 1, wherein the content sharing request is from a sharing party user, and the sharing party user is any member in the chat group; or the sharing party user is a member having a sharing permission in the chat group.

4. The method according to claim 1, further comprising:
   establishing, by the server, the chat group for an organization, for members of the chat group to have a one-to-one correspondence with members of the organization.

5. The method according to claim 4, further comprising:
   sending, by the server, the content and/or an access link of the content to an associated group of the organization.

6. The method according to claim 4, further comprising:
   receiving, by the server, a join request of an applicant user for the organization; and
   adding, by the server, the applicant user to the organization when determining that the applicant user initiates the join request based on a join invitation sent by a member of the organization.

7. The method according to claim 1, wherein the releasing, by the server, the content to be shared to the organization comprises:
   releasing, by the server according to a permission level of a sharing party user, the content to the organization or a sub-level organization of the organization, so that the content to be shared is presented on the content sharing general-interface or a content sharing sub-interface; or
   releasing, by the server according to configuration information of the sharing party user, the content to the organization or a sub-level organization, so that the content to be shared is presented on the content sharing general-interface or a content sharing sub-interface corresponding to the sub-level organization.

8. The method according to claim 1, wherein
   an access permission of the content sharing general-interface is limited to all members of the organization; and
   an access permission of a content sharing sub-interface is limited to all the members of the organization or members of a corresponding sub-level organization.

9. The method according to claim 1, further comprising:
   displaying, by the terminal, prompt information in a display region of the access entry, wherein the prompt information indicates that there is unread shared content and/or unread interactive content in the content sharing interface.

10. The method according to claim 1, wherein the content sharing interface and the messaging interface belong to a same application.

11. The method according to claim 1, wherein the displaying, by the terminal, a content sharing interface corresponding to the chat group comprises:

displaying, by the terminal, the content sharing interface above the messaging interface in a floating manner; or displaying, by the terminal, the messaging interface and the content sharing interface side by side.

12. One or more non-transitory computer-readable storage media storing instructions executable by one or more processors, wherein execution of the instructions causes the one or more processors to perform operations comprising:

displaying a messaging interface of a chat group, the messaging interface including an access entry;

according to a trigger operation on the access entry, displaying a content sharing interface corresponding to the chat group, wherein the content sharing interface is configured to display shared contents of members of the chat group;

determining content to be shared in the chat group;

initiating a content sharing request to a server, for the server to release the content to the chat group;

in response to receiving a release of the content from the server, displaying the content on the content sharing interface; and displaying prompt information in a display region of the access entry, wherein the prompt information indicates that there is unread shared content and/or unread interactive content in the content sharing interface.

13. The storage media according to claim 12, wherein the content sharing interface and the messaging interface belong to a same application.

14. The storage media according to claim 12, wherein the displaying a content sharing interface corresponding to the chat group comprises:

displaying the content sharing interface above the messaging interface in a floating manner.

15. The storage media according to claim 12, wherein the chat group corresponds to an organization comprising at least one sub-level organization; and the content sharing interface comprises: a content sharing general-interface corresponding to the organization and at least one content sharing sub-interface corresponding to the at least one sub-level organization.

16. A system comprising one or more processors and one or more non-transitory computer-readable memories coupled to the one or more processors and configured with instructions executable by the one or more processors to cause the system to perform operations comprising:

displaying a messaging interface of a chat group, the messaging interface including an access entry;

according to a trigger operation on the access entry, displaying a content sharing interface corresponding to the chat group, wherein the content sharing interface is configured to display shared contents of members of the chat group;

determining content to be shared in the chat group;

initiating a content sharing request to a server, for the server to release the content to the chat group;

in response to receiving a release of the content from the server, displaying the content on the content sharing interface; and displaying prompt information in a display region of the access entry, wherein the prompt information indicates that there is unread shared content and/or unread interactive content in the content sharing interface.

17. The system according to claim 16, wherein the content sharing interface and the messaging interface belong to a same application.

18. The system according to claim 16, wherein the displaying a content sharing interface corresponding to the chat group comprises:

displaying the messaging interface and the content sharing interface side by side.

19. The system according to claim 16, wherein the chat group corresponds to an organization comprising at least one sub-level organization; and the content sharing interface comprises: a content sharing general-interface corresponding to the organization and at least one content sharing sub-interface corresponding to the at least one sub-level organization.

* * * * *